(12) United States Patent
Kunihiro et al.

(10) Patent No.: US 11,478,982 B2
(45) Date of Patent: Oct. 25, 2022

(54) THREE-DIMENSIONAL MOLDING APPARATUS AND THREE-DIMENSIONAL MOLDING METHOD USING DIFFERENT TYPES OF MATERIALS

(71) Applicant: KJ CHEMICALS CORPORATION, Tokyo (JP)

(72) Inventors: Yoshio Kunihiro, Kumamoto (JP); Yuya Ishimaru, Kumamoto (JP)

(73) Assignee: KJ CHEMICALS CORPORATION, Tokyo (JP)

( * ) Notice: Subject to any disclaimer, the term of this patent is extended or adjusted under 35 U.S.C. 154(b) by 58 days.

(21) Appl. No.: 16/955,654

(22) PCT Filed: Jun. 24, 2019

(86) PCT No.: PCT/JP2019/024957
§ 371 (c)(1),
(2) Date: Jun. 18, 2020

(87) PCT Pub. No.: WO2020/004328
PCT Pub. Date: Jan. 2, 2020

(65) Prior Publication Data
US 2020/0384683 A1   Dec. 10, 2020

(30) Foreign Application Priority Data

Jun. 25, 2018   (JP) .............................. JP2018-120140

(51) Int. Cl.
*B29C 64/124* (2017.01)
*B29C 64/264* (2017.01)
(Continued)

(52) U.S. Cl.
CPC .......... *B29C 64/124* (2017.08); *B29C 64/209* (2017.08); *B29C 64/232* (2017.08);
(Continued)

(58) Field of Classification Search
CPC .................................................... B29C 64/209
See application file for complete search history.

(56) References Cited

U.S. PATENT DOCUMENTS 5,121,329 A  *  6/1992  Crump .................... B33Y 30/00
                                                   228/180.5
5,134,569 A  *  7/1992  Masters ................ B29C 64/106
                                                     425/162

(Continued)

FOREIGN PATENT DOCUMENTS

JP         02-130132        5/1990
JP         2014-221538     11/2014
(Continued)

OTHER PUBLICATIONS

Official Communication issued in International Patent Application No. PCT/JP2019/024957, dated Sep. 10, 2019, along with an English translation thereof.

*Primary Examiner* — Timothy Kennedy
(74) *Attorney, Agent, or Firm* — Greenblum & Bernstein, P.L.C.

(57) ABSTRACT

A three-dimensional molding apparatus is provided and includes a reservoir portion, a nozzle portion, a liquid-sending unit, and a temperature control unit that correspond to each of the two or more different types of materials, a molding stage, a relative movement mechanism for moving the stage and the nozzle portions, and a control computer. By using this apparatus, industrial additive manufacturing with two or more different types of materials can be realized with high precision, and high-definition molded products in which different types of materials are arbitrarily combined can be produced.

20 Claims, 11 Drawing Sheets

(51) Int. Cl.
  *B29C 64/232* (2017.01)
  *B29C 64/255* (2017.01)
  *B29C 64/209* (2017.01)
  *B29C 64/393* (2017.01)
  *B29C 64/236* (2017.01)
  *B29C 64/336* (2017.01)
  *B33Y 10/00* (2015.01)
  *B33Y 30/00* (2015.01)

(52) U.S. Cl.
  CPC .......... *B29C 64/236* (2017.08); *B29C 64/255* (2017.08); *B29C 64/264* (2017.08); *B29C 64/336* (2017.08); *B29C 64/393* (2017.08); *B33Y 10/00* (2014.12); *B33Y 30/00* (2014.12)

(56) References Cited

U.S. PATENT DOCUMENTS

| | | | | |
|---|---|---|---|---|
| 5,216,616 A * | 6/1993 | Masters | ............ | G05B 19/4099 700/118 |
| 5,529,471 A * | 6/1996 | Khoshevis | ............ | B33Y 40/00 425/150 |
| 5,633,021 A * | 5/1997 | Brown | ............ | B29C 41/36 425/375 |
| 9,073,366 B1 * | 7/2015 | Din | ............ | B41J 11/04 |
| 9,993,964 B2 * | 6/2018 | Mantell | ............ | B29C 64/393 |
| 2002/0105114 A1 * | 8/2002 | Kubo | ............ | B29C 64/153 425/375 |
| 2004/0164436 A1 * | 8/2004 | Khoshnevis | ............ | E04G 21/0463 425/463 |
| 2005/0053798 A1 * | 3/2005 | Maekawa | ............ | B29C 64/106 264/497 |
| 2009/0134540 A1 * | 5/2009 | Khoshnevis | ............ | B33Y 30/00 425/169 |
| 2014/0048969 A1 * | 2/2014 | Swanson | ............ | B29C 64/209 264/129 |
| 2014/0048970 A1 * | 2/2014 | Batchelder | ............ | B29C 64/106 264/129 |
| 2014/0265040 A1 * | 9/2014 | Batchelder | ............ | B29C 64/106 264/412 |
| 2015/0076739 A1 * | 3/2015 | Batchelder | ............ | B29C 48/266 264/401 |
| 2015/0190967 A1 * | 7/2015 | Stava | ............ | B29C 64/393 427/256 |
| 2016/0250808 A1 * | 9/2016 | Barnwell, III | ............ | B29C 64/106 264/401 |
| 2017/0157845 A1 * | 6/2017 | Bihari | ............ | B29C 64/393 |
| 2017/0246802 A1 * | 8/2017 | Pyzik | ............ | B29C 64/106 |
| 2017/0320270 A1 | 11/2017 | Mandel et al. | | |
| 2018/0065316 A1 * | 3/2018 | Tyler | ............ | B29C 48/154 |
| 2018/0169971 A1 * | 6/2018 | Rupel | ............ | B33Y 50/02 |
| 2019/0022725 A1 * | 1/2019 | Bauer | ............ | B29C 64/118 |
| 2019/0217541 A1 * | 7/2019 | Duro Royo | ............ | G05B 15/02 |
| 2020/0001523 A1 * | 1/2020 | Anegawa | ............ | B33Y 10/00 |

FOREIGN PATENT DOCUMENTS

| | | |
|---|---|---|
| JP | 2015-036234 | 2/2015 |
| JP | 2015-136915 | 7/2015 |
| JP | 2016-060058 | 4/2016 |
| JP | 2016-074178 | 5/2016 |
| JP | 2017-094599 | 6/2017 |
| JP | 2017-200762 | 11/2017 |
| JP | 2018-079652 | 5/2018 |

* cited by examiner

THREE-DIMENSIONAL MOLDING APPARATUS AND THREE-DIMENSIONAL MOLDING METHOD USING DIFFERENT TYPES OF MATERIALS

TECHNICAL FIELD

The present invention relates to a three-dimensional molding apparatus, a three-dimensional molding method, and a three-dimensional molded product using different types of materials.

BACKGROUND ART 3D printers are generally applied as a technique for producing three-dimensional molded products by using 3D-CAD data. Three-dimensional molding apparatuses for three-dimensionally molding various materials such as metals, plastics, and foods are beginning to be used in various fields.

Many actual industrial products are produced by combining different types of materials having different mechanical properties rather than by using a single material. However, molding by combining different types of materials having different mechanical properties was difficult with conventional 3D printers.

For example, in fused deposition modeling, although multiple molding materials can be dispensed at the same time, since every material must be dispensed from a nozzle heated to a temperature equal to or higher than the melting point, and since good interlayer adhesion cannot be obtained and sufficient strength of the molded product cannot be obtained when the molding temperature is low due to the difference in the shrinkage ratio, coefficient of linear expansion, melting temperature, and the like of the thermoplastic resins used as the molding materials, molding is normally performed at 200° C. or higher. The use of low-melting-point materials, soft materials, and the like was therefore difficult when molding by means of fused deposition modeling.

In a UV inkjet 3D printer which is one means for optical molding, multiple materials having different properties, such as a material to be used as a support material for supporting the shape and a material used as a modeling material for constructing the shape, can be used at the same time to produce a single molded product. However, since the biggest feature of the inkjet method lies in molding a product from a fine ink-like state, photo-curable resin itself used as the modeling material and the support material needs to be inkjet-sprayed and irradiated with ultraviolet rays to be solidified. Reduction of the viscosity of the ink (normally less than 20 mPa·s) has therefore been an important issue and the use of a high-viscosity photo-curable resin was difficult. In addition, since a low-viscosity photo-curable resin has a low molecular weight and it is therefore difficult to achieve practical values for mechanical strength, impact resistance, and the like in the obtained molded product, it is impossible to reproduce all the properties of engineering plastics such as ABS.

Patent Literature 1 proposes a method for producing a three-dimensional printed object by using a photopolymer material and a thermoplastic material as different types of molding materials and by depositing the two materials in a layer-by-layer manner. In this method, too, since the photopolymer material is dispensed from an injector in the form of a liquid, the photopolymer is fluid until cured. The photopolymer therefore flows around the thermoplastic resin, and there was a risk that the photopolymer might penetrate too deeply into thermoplastic members, making curing difficult. Patent Literature 1 proposes preventing the photopolymer from penetrating too far by forming a solid layer with the thermoplastic material, but since moldable structures and applicable resins and materials are limited, this method could not be considered to be a suitable method for precision three-dimensional molding. In particular, there were problems that high-viscosity photo-curable materials could not be used and that mechanical properties of the molded product could not be ensured.

In Patent Literature 2, a resin mold is formed by placing a molding stage in a reservoir tank for a liquid energy ray-curable resin and by performing three-dimensional molding whereby the energy ray-curable resin is cured through irradiation with an energy ray, and then a heated product resin material is injected into the resin mold. Molded products with desirable shapes can thereby be formed from any thermoplastic resin, and molding time can be shortened and costs can be reduced compared to conventional die injection molding. However, in this method, too, it was difficult to use a high-viscosity photo-curable resin as a mold material and it was impossible to produce a molded product in combination with a non-photo-curable material. The types of materials that can be molded by this method were therefore limited. This method further requires a demolding step to take the molded product out from the mold, and Patent Literature 2 mentions as the demolding means a method in which the mold is broken by applying an impact with a hammer or the like, a method in which high-pressure air is injected into the interface between the mold and the molded product to separate them, and a method in which the mold is immersed in a solvent which selectively dissolves the resin constituting the mold, but all methods require washing of the molded product and the risk of breaking the molded product remains.

Patent Literature 3 proposes a method for producing a cured object by dispensing a liquid pasty photo-curable resin from a dispending nozzle in the form of a string, and then irradiating the same with a light in a state where a constant shape is maintained without spreading so as to produce a cured product having a prescribed molding pattern. The photo-curable resin used in this method excels in thixotropic properties. That is, the photo-curable resin is fluid at the point of being dispensed from the nozzle but becomes still and the viscosity rapidly increases after being dispensed, and the resin is cured without changing the dispensed shape. This method avoids problems such as spreading of uncured resin to unwanted parts and smearing caused by adhesion of the resin to surrounding parts, but it is very difficult to completely match the thickness and shape of the string-like cured product, and there were problems that fine strings were difficult to produce and products with high molding precision could not be obtained. Also, spaces are formed between the strings and the surface becomes uneven when producing a flat molded product by this method, and satisfactory strength and appearance of the molded product could not be obtained. In addition, when molding by combining multiple materials having different physical properties or molding in combination with a different type of material such as a thermoplastic resin, there are problems of wettability and adhesion between the different types of materials, and the method cannot be directly applied to molding using different types of materials.

CITATION LIST

Patent Literature

Patent Literature 1: JP 2017-200762 (A)
Patent Literature 2: JP 2018-079652 (A)
Patent Literature 3: JP 1990-130132 (A)

SUMMARY OF INVENTION

Technical Problem

The object of the present invention is to provide an apparatus, a method for molding an industrially useful three-dimensional molded product in which different types of materials are combined, and a molded product.

Solution to Problem

As a result of intensive studies to solve the above problem, the inventors of the present invention found a three-dimensional molding apparatus using two or more types of molding materials and arrived at the present invention. Specifically, the inventors found a three-dimensional molding apparatus comprising one or more nozzles having a mechanism for outputting a molding material (A) having a dispense viscosity of from 0.01 to 1000 Pa·s at a dispensing temperature of from 20 to 150° C., one or more nozzles having a mechanism for discharging a molding material (B) having a melt flow rate (MFR) of from 1 to 400 g/10 min (load: 2.16 kg) at a molding temperature of from 60 to 350° C., a stage portion onto which the materials are output from the nozzles, and a relative movement mechanism(s) for three-dimensionally relatively moving the stage portion and the nozzle portions.

The present invention provides (1) a three-dimensional molding apparatus using two or more molding materials, the materials being a material A and a material B, the apparatus comprising
reservoir portions for storing the molding materials,
nozzle portions for dispensing the molding materials,
liquid-sending units for transporting the materials from the reservoir portions to the nozzle portions, temperature control units,
a molding stage,
a relative movement mechanism for three-dimensionally relatively moving the stage and the two or more nozzle portions, and
a computer for controlling the liquid-sending units, the temperature control units, and the relative movement mechanism;

(2) the three-dimensional molding apparatus as described in (1), wherein at least one material A and at least one material B are simultaneously dispensed, a dispensing temperature of the material A is from 20° C. to 150° C., and a dispense viscosity of the material A is from 0.01 to 1000 Pa·s;

(3) the three-dimensional molding apparatus as described in (1) or (2), wherein a dispensing method of the material A is one or more selected from a syringe method, a volumetric dosing method, a tubing method, and a plunger method;

(4) the three-dimensional molding apparatus as described in any one of (1) to (3), wherein the liquid-sending unit for the material A is one or more quantitative liquid-sending units selected from a quantitative syringe pump liquid-sending unit, a quantitative gear pump liquid-sending unit, a quantitative tube pump liquid-sending unit, and a quantitative dispense valve liquid-sending unit;

(5) the three-dimensional molding apparatus as described in any one of (1) to (4), wherein a dispensing temperature of the material B is from 60° C. to 350° C., and a melt flow rate (MFR) of the material B at the dispensing temperature is from 1 to 400 (g/10 min, load: 2.16 kg);

(6) the three-dimensional molding apparatus as described in any one of (1) to (5) further comprising a light irradiation portion;

(7) the three-dimensional molding apparatus as described in any one of (1) to (6), wherein a nozzle curing prevention portion is further provided to the nozzle portion for dispensing the material A;

(8) the three-dimensional molding apparatus as described in any one of (1) to (7), wherein the nozzle curing prevention portion limits an irradiation area of a light emitted from the light irradiation portion, and the irradiation area is a circle concentric with an end of the nozzle portion for dispensing the material A, the circle having a diameter ranging from 1 to less than 100 times a diameter of the end of the nozzle portion for dispensing the material A;

(9) a method for producing a three-dimensional molded product, the method comprising dispensing a material A and a material B simultaneously or in turn onto a stage so as to form same or different layers and to stack the layers at the same time;

(10) the method for producing a three-dimensional molded product as described in (9), wherein molding is carried out while bringing an end(s) of a nozzle(s) for dispensing the material A and/or the material B into contact with the material(s) dispensed from each nozzle;

(11) the method for producing a three-dimensional molded product as described in (9) or (10), wherein two or more molding materials comprise at least one material A and at least one material B, the material A is molded at a molding temperature ranging from 20° C. to 150° C., and a viscosity of A at the molding temperature is from 0.01 to 1000 Pa·s;

(12) the method for producing a three-dimensional molded product as described in any one of (9) to (11), wherein the material B is molded at a molding temperature ranging from 60° C. to 350° C., and a melt flow rate (MFR) of B at the molding temperature is from 1 to 400 (g/10 min, load: 2.16 kg);

(13) the method for producing a three-dimensional molded product as described in any one of (9) to (12), wherein the material (A) is a resin composition comprising 10% by mass or more of a photo-curable component;

(14) the method for producing a three-dimensional molded product as described in any one of (9) to (13), wherein the material A is cured by means of light irradiation while being dispensed from the nozzle at a temperature of 20° C. or higher;

(15) the method for producing a three-dimensional molded product as described in any one of (9) to (14), wherein the material B is dispensed from the nozzle at a temperature of 60° C. or higher and then is solidified by cooling.

Advantageous Effects of Invention

By having at least one nozzle having a mechanism for outputting material A and at least one nozzle having a mechanism for outputting material B, the three-dimensional molding apparatus of the present invention is capable of producing a molded product composed of multiple types of materials by using multiple types of molding materials.

Material A and material B are selected from a wide variety of molding materials from soft rubber materials to high-strength plastic materials in accordance with the purpose and are output and molded by a single three-dimensional molding apparatus. When A contains a photo-curable component, a molded product of a crosslinked resin can be obtained through light irradiation, and physical properties of the molded product such as thermal stability and mechanical properties can be further improved by crosslinking.

In a molding method using the three-dimensional molding apparatus of the present invention, a molded product can be produced without using a material having a supporting function (support material) and the molded product can be directly used after molding.

DESCRIPTION OF EMBODIMENTS

Embodiments of the present invention will be described below by reference to the figures.

Figure 1:
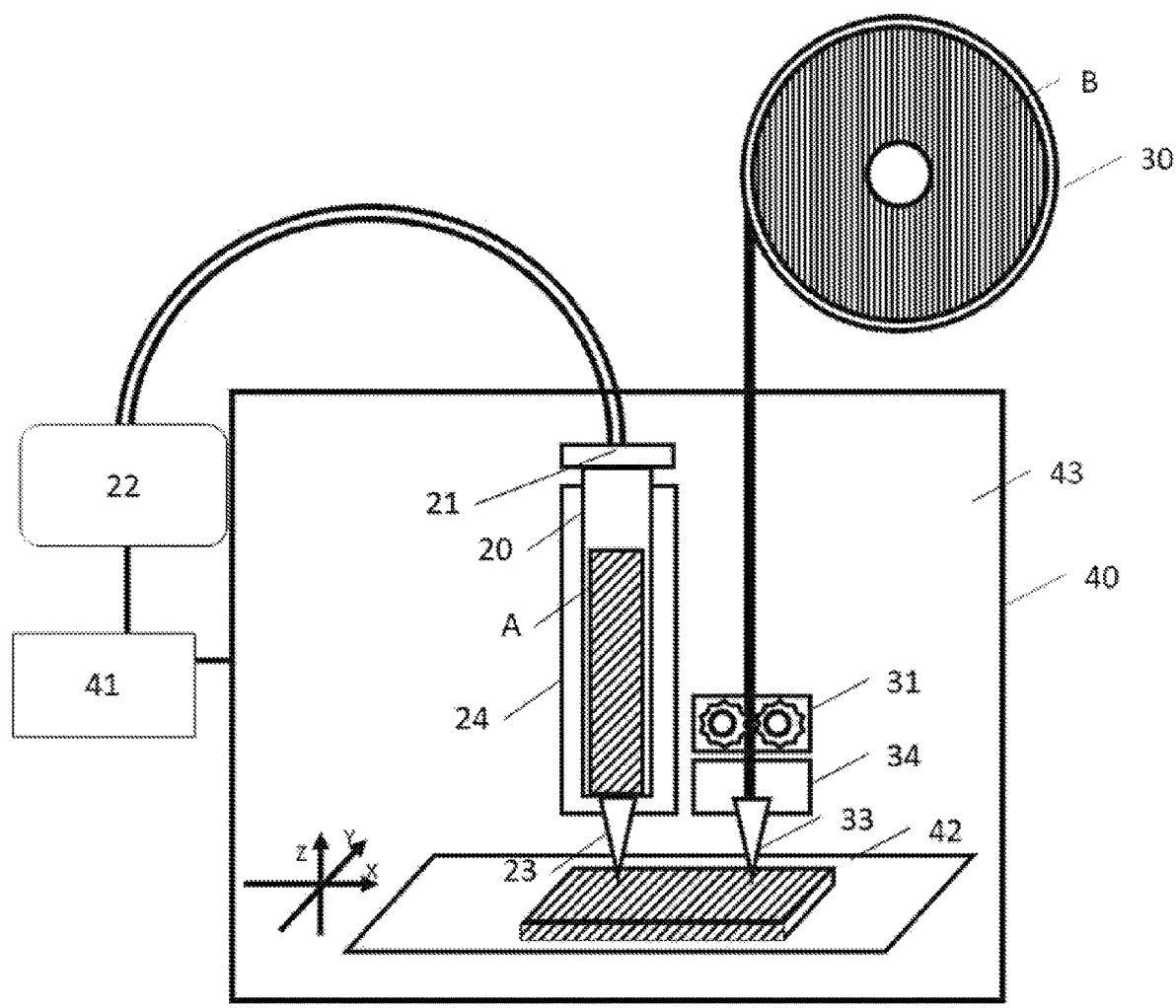
FIG. 1 shows an apparatus for producing a three-dimensional molded product using different types of materials (case where the mechanism for outputting material A is a syringe pump).
Figure 2:
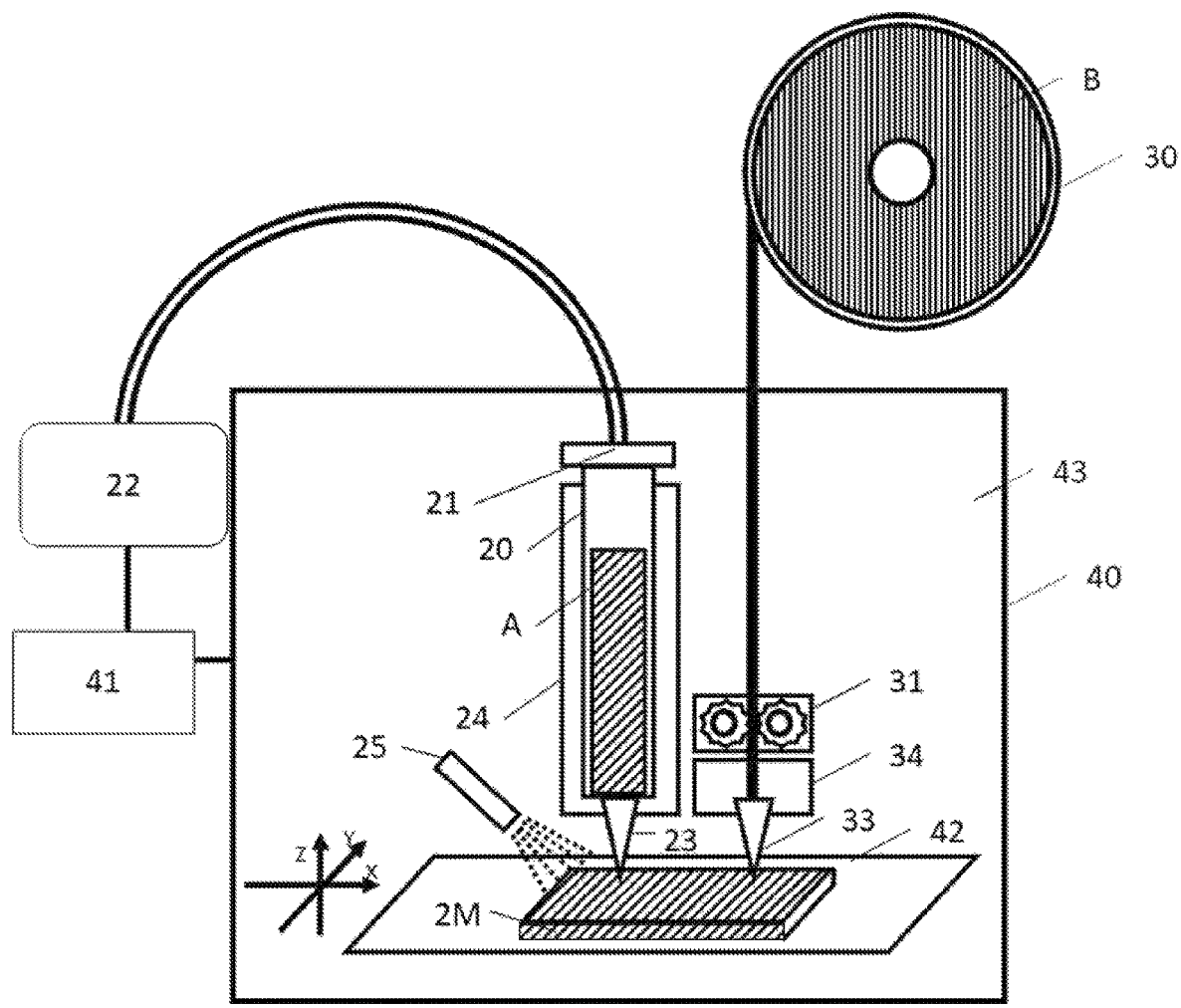
FIG. 2 shows an apparatus for producing a three-dimensional molded product using different types of materials (case where material A contains a photo-curable component).

As shown in FIG. 1, the three-dimensional molding apparatus of the present invention dispenses, from at least one nozzle having a mechanism for outputting material A having a viscosity of from 0.01 to 1000 Pa·s at the molding temperature and at least one nozzle having a mechanism for outputting material B having a melt flow rate of from 1 to 400 g/10 min (load: 2.16 kg) at the molding temperature, each molding material onto a molding stage and molding is conducted by stacking layers of the materials to form a three-dimensional molded product. Also, as shown in FIG. 2, when A contains a photo-curable component, a three-dimensional molded product is formed by curing A by light irradiation as A is dispensed from the nozzle and conducting molding by stacking layers of the materials. A molded product obtained from material A is referred to as 2M and a molded product obtained from material B is referred to as 3M.

(Unit for Dispensing Material A)

Material A can be molded by stacking it as it is dispensed by using a unit such as a dispenser. The molding temperature can be suitably adjusted in accordance with the operability and the properties of material A, and the dispensing temperature is preferably from 20 to 150° C. when also considering the molding precision and the molding speed. The viscosity of A is from 0.01 to 1000 Pa·s at this temperature range. Material A preferably has a viscosity at 20° C. of 0.01 Pa·s or more and a viscosity at 150° C. of 1000 Pa·s or less to achieve good dispensing property and excellent moldability by adjusting the diameter (inner diameter) of the nozzle portion for dispensing material A and/or by adjusting the dispensing pressure. The viscosity of A at the molding temperature is more preferably from 0.1 to 800 Pa·s, and most preferably from 0.2 to 600 Pa·s.

Figure 3:
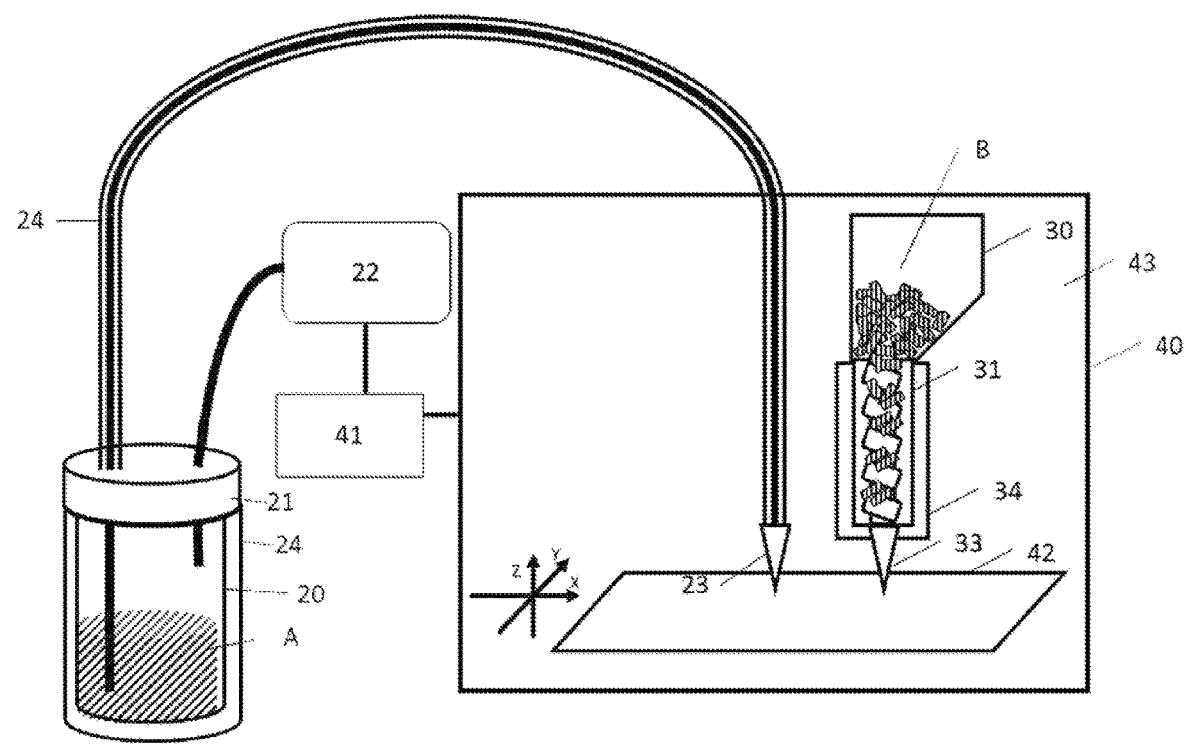
FIG. 3 shows an apparatus for producing a three-dimensional molded product using different types of materials (case where the reservoir portion 20 for material A is a sealed container).
Figure 4:
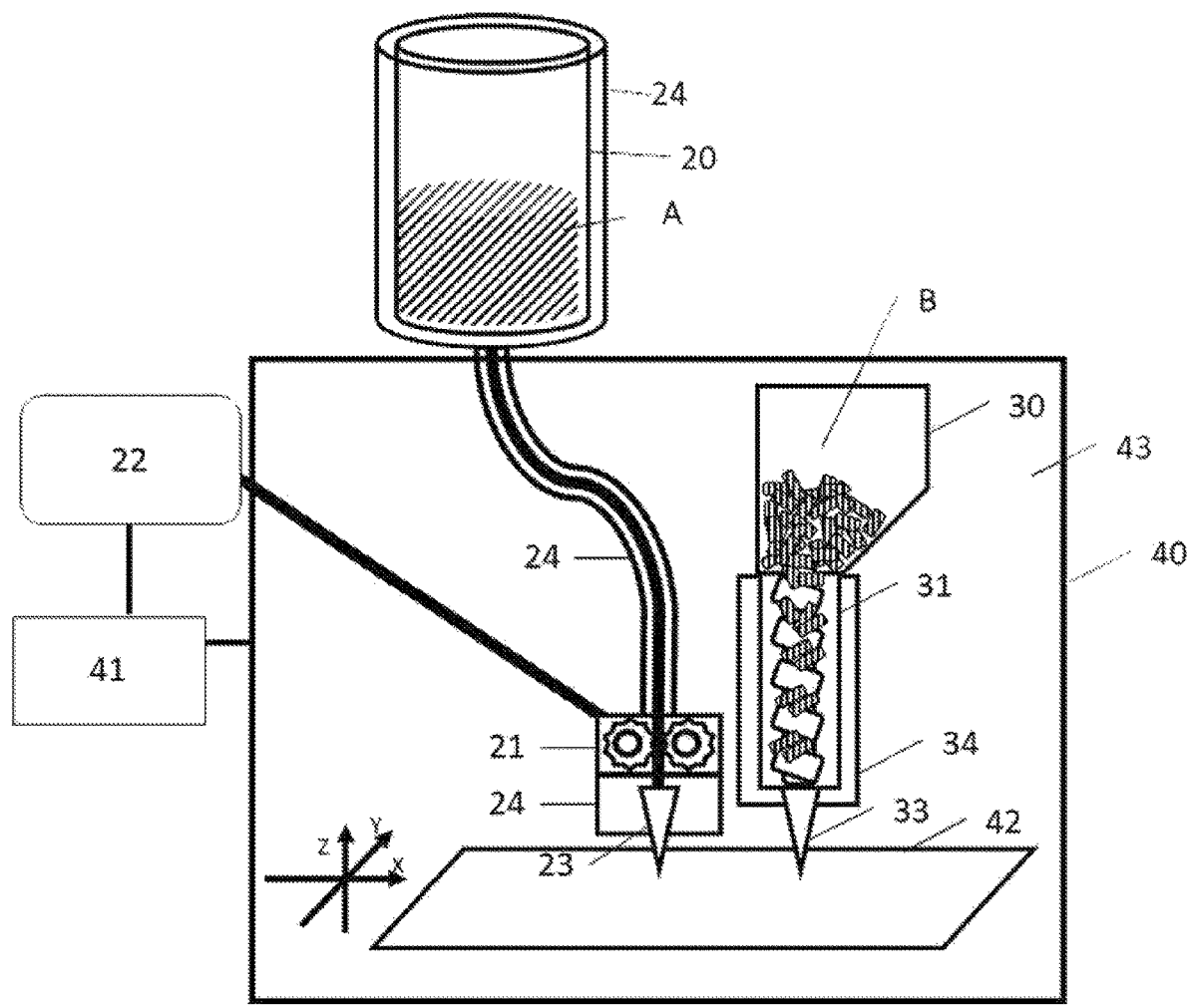
FIG. 4 shows an apparatus for producing a three-dimensional molded product using different types of materials (case where the mechanism for outputting material A is a gear pump).

Any unit that can quantitatively sends liquids may be used as the unit for dispensing material A. Examples of such liquid-sending units include quantitative syringe pump, quantitative gear pump, quantitative tube pump, and quantitative dispensing valve. Specific examples include syringe dispensers which extrude a material by air pulse, volumetric dosing dispensers which extrude a material by volumetric dosing and motor drive without the use of air, tubing dispensers which discharge a material inside a tube by applying pressure to the tube itself containing the material, and plunger dispensers which mechanically compress a material inside a cylinder. Among these examples, syringe dispensers which have versatility, are easy to maintain, allow continuous setting of the pressure, and quantitatively dispense a variety of liquids with low, medium, and high viscosity with good reproducibility, and volumetric dosing dispensers which have high precision and excel in dispensing speed and long-term stability are preferable. A dispenser used in the present invention is a quantitative dispenser comprising a reservoir portion 20, a pressurizing portion 21, a pressurization controller portion 22, and a nozzle portion 23 as shown in FIGS. 1, 3, and 4.

Material A is stored in the reservoir portion 20, and a control computer 41 sends a signal to the pressurization controller portion 22 so that the pressurizing portion 21 applies pressure to the reservoir portion 20 and material A, and A is dispensed onto the stage from the nozzle portion 23.

The pressurization method of the pressurizing portion 21 is suitably selected in accordance with the type of the dispenser, and pressure can be applied by means of compressed air extrusion, piston extrusion, gear or screw extrusion, or the like singly or in combination. A pressurization method using pressurized air combined with a gear or a screw is preferable since the pressurization state can be immediately changed. Also, by selecting a pressurization method using a gear or a screw, fine control of the dispensing amount is possible without being affected by the viscosity of A. Since a pressurization method using pressurized air is applicable to a broad temperature range and pressurization can be easily controlled, this method is preferably applied when heated A is used. A valve may be provided between the pressurizing portion 21 and the dispensing portion so as to immediately and precisely change the pressurization state.

The pressurizing portion 21 preferably comprises a mechanism having a function to suck up A in the direction of the reservoir portion 20 during a period when A is not dispensed by any one of or a combination of two or more selected from decompressed gas, a gear, a screw, and a piston. Excess output of the molding material can be suppressed during standby where A is sucked up in a direction opposite to the dispensing direction.

Pressurization by the pressurizing portion 21 which applies pressure to material A is controlled by the pressurization controller portion 22, and pressurization can be suitably adjusted in accordance with the shape of the dispensing outlet, heating temperature, and required molding speed and precision. The pressurization controller portion 22 may be included in the built-in functions of the control computer 41, or may be separately provided in a manner such that it coordinates with the control computer 41.

A heating/cooling portion 24 may be provided to heat or cool material A in the reservoir portion 20 and the nozzle portion 23. The heating or cooling temperature may be suitably decided in accordance with the type of A as long as A can be smoothly dispensed from the nozzle portion 23. The molding temperature is normally from 20 to 150° C., preferably from 40 to 100° C. In the case of high-molecular-weight or high-viscosity molding materials, in particular, the viscosity of A can be reduced by heating to 60° C. or more and sufficient molding speed and precision can be ensured thereby.

The portion to be heated or cooled by the heating/cooling portion 24 is either one or both of the reservoir portion 20 and the nozzle portion 23. The temperature for heating/cooling the reservoir portion 20 and the nozzle portion 23 may be the same or different. Various heating/cooling methods can be applied, and methods using a Peltier device, a heater, or a liquid heating medium such as water or an organic solvent can be mentioned as examples.

As the reservoir portion 20 for material A, a container for storing a liquid such as a tank, a barrel, or a hose can be used alone or in combination. When the molding material used is heated/cooled, a container which is not deformed due to temperature change is preferably used, and plastic containers made of PE, PP, PET, or the like, containers made of rubber, and containers made of a metal such as copper, aluminum, iron, or stainless steel can be used, for example. As shown in FIG. 3, when the reservoir portion 20 is a sealed container, the control computer 41 sends a signal to the pressurization controller portion 22 so that the pressurizing portion 21 applies pressure to the reservoir portion 20 and material A to dispense A onto the stage from the nozzle portion 23. Also, a heating/cooling portion 24 can be provided to heat/cool A and the reservoir portion 20. A heating/cooling unit or a heat-retaining unit may be attached to the liquid-sending pipe and the like which extends from the reservoir portion 20 to the nozzle portion 23 as necessary. Similarly, the reservoir portion 20, the liquid-sending pipe and the nozzle portion 23 for A may be controlled at the same temperature or different temperatures as necessary.

Various materials can be used as the material for the nozzle portion 23 in accordance with use purposes. Since there are cases where the nozzle portion 23 is heated or cooled, and cases where material A is heated or cooled and/or pressurized or decompressed, non-deforming materials are preferably used. For example, the nozzle portion 23 can be made of a resin, a metal, or a composite or combination of a resin and a metal, and a liquid-repellent coating may be further provided.

The inner shape of the nozzle portion 23 can be selected in accordance with the purpose. From the viewpoint of reducing the loss of dispensing pressure (pressure applied to the dispensing portion by the pressurizing portion 21), the inner nozzle diameter (inner diameter) is preferably large as long as the molding precision is not deteriorated, the tube length of the portion with the minimum inner diameter is preferably small, and the inside of the nozzle portion preferably has a tapered shape. Also, the end of the dispensing outlet preferably has a circular shape in terms of reducing the pressure loss and of dispensing at an even rate to every direction.

It is a feature of the present invention that molding is carried out while bringing the end portion of the nozzle portion 23, i.e., dispensing outlet, used in the molding apparatus of the present invention into contact with the dispensed molding material. Since the dispensing outlet is in contact with the molding material, the molding material can be flattened and the thickness of each layer can be equalized. Although the suitable inner diameter of the dispensing outlet varies depending on the viscosity of the molding material and the molding temperature and pressure, but it is preferably from 0.01 to 10 mm, more preferably from 0.05 to 5.0 mm, most preferably from 0.1 to 3.0 mm in view of the balance between molding precision and molding speed. The pressure applied to the dispensing outlet can be sufficiently reduced and the molding speed will not be reduced when the inner diameter of the dispensing outlet of the nozzle is 0.01 mm or more. Also, sufficient molding precision can be secured when the inner diameter is 10 mm or less. It is furthermore preferable that the inner diameter of the dispensing portion and the outer diameter of the end have a circular shape and that the difference between the inner diameter and the outer diameter of the end be as small as possible. For example, a nozzle with an ultrathinned end portion can be mentioned. The difference between the outer diameter and the inner diameter is preferably 2.0 mm or less, more preferably 1.0 mm or less, most preferably 0.5 mm or less. This difference is preferably 2.0 mm or less to obtain good molding precision and to prevent adhesion of the molding material to the periphery of the dispensing outlet.

The stacking thickness which corresponds to the distance between the nozzle portion 23 and the stage or the molded product is preferably smaller than the inner diameter of the nozzle. By making the stacking thickness smaller than the nozzle inner diameter, dispensed A will be compressed between the nozzle and the stage or the molded product. Thereby, flatness can be imparted to the molded surface by moving the nozzle under this compressed state and the interlayer adhesion of the additive manufactured product can be improved at the same time. The stacking thickness is preferably from 10 to 80% of the nozzle inner diameter. Sufficient molding speed can be secured when this ratio is 10% or more and sufficient flatness of the molded surface and sufficient interlayer adhesion can be ensured when this ratio is 80% or less.

The outer shape of the nozzle portion 23 may be tapered from the dispensing outlet. Tapering suppresses buildup of the dispensed liquid and prevents deterioration of molding precision. Adhesion of material A to the nozzle portion 23 can also be reduced by surface treatment other than tapering, such as liquid-repellent treatment.

Material A is dispensed from the nozzle portion 23 and solidified or gelled by the temperature change before and after dispensing or through light irradiation after dispensing. Materials containing a gelling agent which consists of a polysaccharide, plastisols, thermosetting resin materials, and photo-curable resin materials, for example, can be used as material A. Two or more liquid materials that can be solidified or gelled by mixing can also be used.

Heating, mixing, and the like in the reservoir portion 20 and/or the nozzle portion 23 can be mentioned as the treatment of A before being dispensed. For example, a plastisol is heated in the reservoir portion 20 and the nozzle portion 23 to dissolve the plastic in the material in a plasticizer before dispensing. The dispensed material can then be solidified or gelled by cooling. Also, in the case of a two-component curable material, for example, curing reaction begins upon mixing in the nozzle portion 23, and post-curing reaction proceeds and the material is solidified or gelled after the material is dispensed onto the stage 42.

Cooling, heating, light irradiation, and the like, for example, can be carried out as the treatment of A after being dispensed. Ambient air and cold gas can be mentioned as the means for cooling, and hot air, infrared irradiation, light irradiation, and the like can be mentioned as the means for heating. When material A is cured by light, preferable mechanism of curing is radical polymerization, but other mechanisms of photocuring are also applicable. Cationic polymerization, anionic polymerization, and the like can be mentioned as other mechanisms. Hybrid curing by combining multiple photocuring mechanisms, and dual curing by combining thermal curing and photocuring are also applicable. There is no limitation to these treatments, and a suitable treatment can be selected in accordance with the materials. As shown in FIG. 2, infrared light, visible light, ultraviolet light (UV), laser beam, electron beam, and the like can be emitted at the light irradiation portion 25 with the use of various light sources.

(Light Irradiation)

When ultraviolet light is used for light irradiation, light sources based on Hg, Xe, metal halide, etc., LED light sources, excimer light source, etc. can be used. The use of LED light sources is preferable in terms of costs, shape of the apparatus, and safety. When curing A by light irradiation, A preferably contains 10% by mass or more of a photo-curable component from the viewpoint of curability and molding speed.

The area of light irradiation from the light irradiation portion 25 is the area remaining after excluding from the area of the molding stage the area of a circle having a diameter ϕM that is larger than the diameter (outer diameter) ϕL of the end of the nozzle portion 23. Since 2M obtained by curing A that is in contact with the end of the nozzle 23 is not irradiated when the irradiation area is within this range, clogging of the nozzle and adhesion of cured resin crumbs to the nozzle end can be avoided and high precision molding operation can be smoothly carried out for a long period of time. Also, as shown in the image drawing (FIG. 5) of a cross-section of the nozzle portion, the area of light irradiation is the difference (circular ring) between the areas of concentric circles having a diameter ϕN and a diameter ϕM. Light irradiation is preferably in the form of a circular ring (donut shape) having a diameter (ϕN−ϕM) so that A can be homogeneously cured. Also, the diameters ϕN and ϕM of the circular rings are greater than ϕL, ϕM is preferably equal to or smaller than ϕN, ϕN is more preferably 1000 times or less ϕL, and ϕN is particularly preferably 500 times or less ϕL. It is more preferable that ϕN does not exceed 1000 times ϕL so that A can be homogeneously and rapidly cured, although it depends on the size of the nozzle end.

Figure 5:
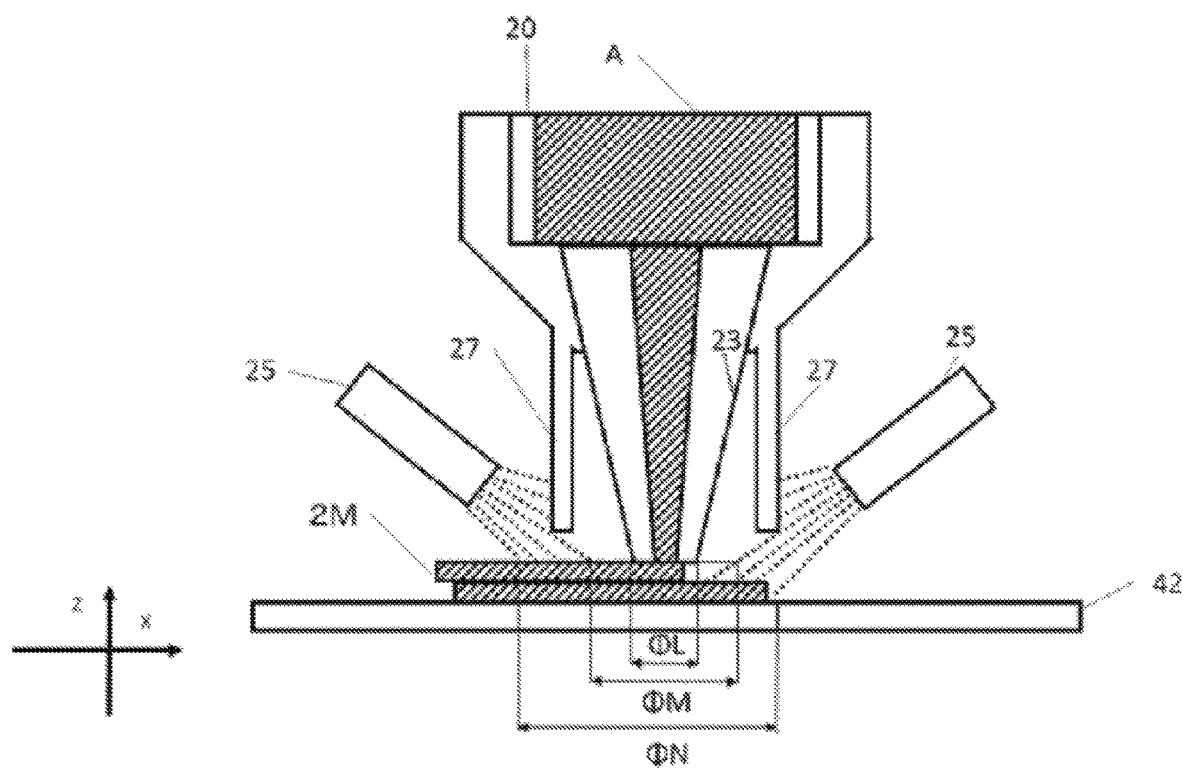
FIG. 5 shows the relationship between the irradiation area (circular ring of diameter ϕN–diameter ϕM) limited by the nozzle curing prevention portion and the circle of the diameter ϕL (outer diameter) of the nozzle portion.

If light irradiation can be controlled within the aforementioned prescribed irradiation area, there is no limitation to the structure of the apparatus such as the irradiation portion, nozzle portion, and the periphery of the nozzle end. For example, a nozzle curing prevention portion 27 can be provided between the light irradiation portion 25 and the nozzle portion 23. As shown in FIG. 5, a part of the light emitted from the irradiation portion 25 is blocked by the nozzle curing prevention portion 27, and A that is in contact with the end of the nozzle portion 23 will not be irradiated. Troubles such as clogging of the nozzle end and dispense failure can be suppressed thereby.

The shape and position of the nozzle curing prevention portion 27 are not particularly limited as long as nozzle curing prevention effect is achieved. Also, it is more preferable that the nozzle curing prevention portion 27 be fixed to the nozzle portion 23 so that the nozzle curing prevention portion can be moved integrally with the nozzle portion and that the nozzle curing prevention effect can be maintained even when the nozzle portion rapidly moves side to side and back and forth at the time of molding. Furthermore, the integrated configuration of the nozzle portion 23 and the nozzle curing prevention portion 27 prevents material A that is in contact with the end of the nozzle portion 23 from curing and enables irradiation of a broad area of the molded product. The overall cure rate of A can be improved thereby.

The end of the nozzle curing prevention portion 27 is not in contact with the stage 42, the molding surface, or the molded product, is shorter than the end of the nozzle portion 23, and is not in contact with the end of the nozzle portion 23. The length, shape, and position of the nozzle curing prevention portion 27 can be suitably adjusted in accordance with the position, number, and irradiation angle of the light irradiation portion 25. As shown in FIG. 5, inner side of the circle with a diameter ϕM will not be irradiated (the limited irradiation area will hereinafter be called "non-irradiated area") by providing the nozzle curing prevention portion 27. In other words, the end of the nozzle portion 23 (circle with a diameter ϕL) will infallibly not be irradiated and troubles such as clogging of the nozzle end and dispense failure can be suppressed. Dispense failure of the nozzle portion can be prevented and the molded product can be sufficiently cured at the same time when ϕM is larger than 1.0 times ϕL and equal to or less than 100 times ϕL. Also, from the viewpoint of improving curability and molding speed, ϕM is preferably 1.2 times or more and 50 times or less ϕL. ϕM is more preferably 1.5 times or more and 10 times or less ϕL.

Light irradiation is preferably carried out in combination with dispensing of material A. By irradiating with light only at the time of dispensing A, curing of material A adhered to the end of the nozzle portion 23 can be suppressed and clogging of the nozzle can be prevented.

If light irradiation is required during suspension of dispensing A due to curability of material A, a mobile irradiation portion can be used as the light irradiation portion 25 so as to prevent clogging of the nozzle. A servomotor, a stepping motor, a brake mechanism, and the like for rotating or moving the irradiation portion up and down and side to side can be provided to the mobile irradiation portion.

Since oxygen which is an inhibiting factor against polymerization can be removed by curing material A by light irradiation in an inert gas atmosphere or in vacuum, reaction will accelerate. Introduction of an inert gas or reduction of the pressure can be performed at any stage before molding, during molding, or after molding. Nitrogen, argon, carbon dioxide, and the like can be used as the inert gas, for example, and the use of nitrogen and carbon dioxide is preferable in terms of costs and availability.

Figure 10:
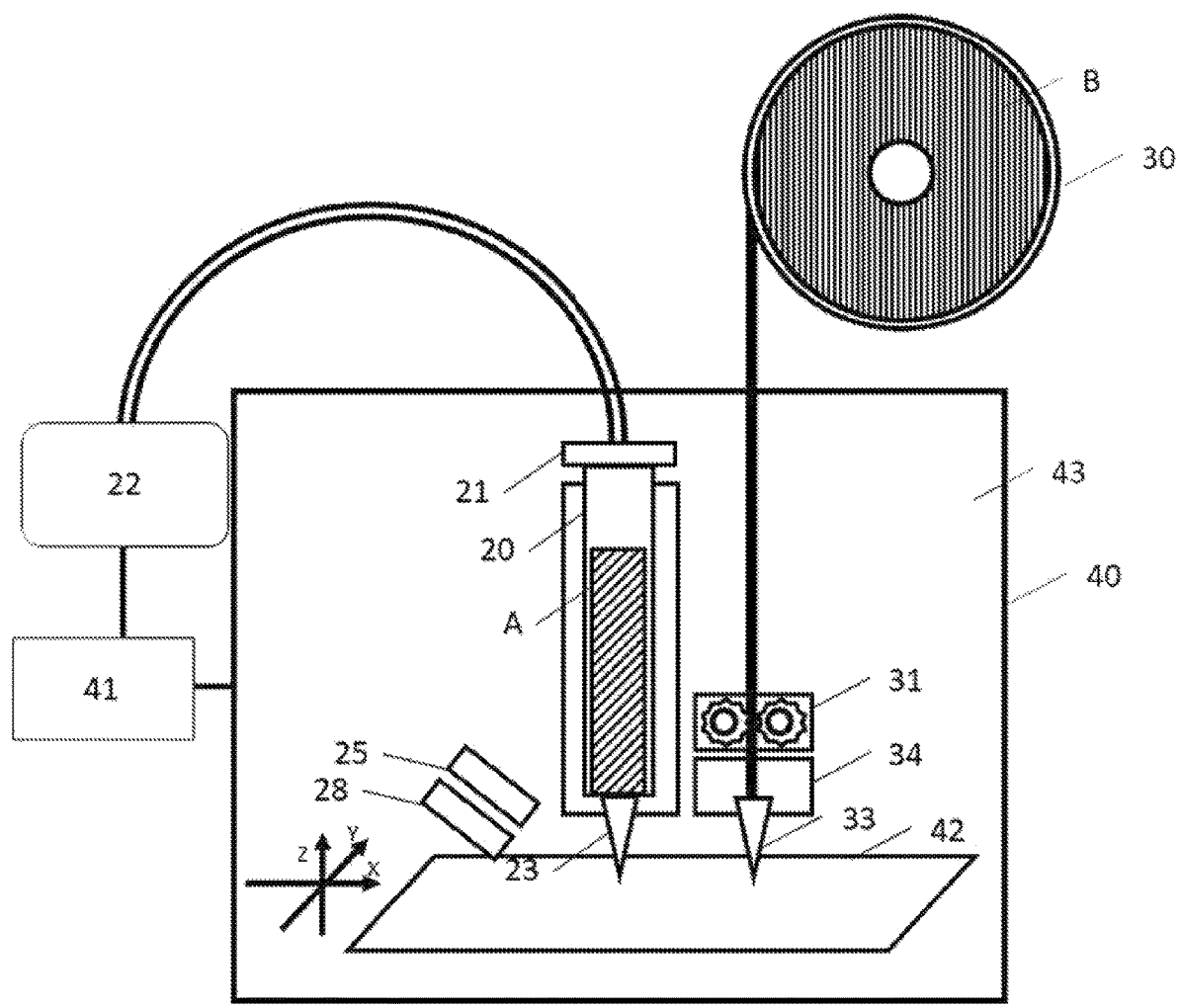
FIG. 10 shows an apparatus for producing a three-dimensional molded product using different types of materials (case where material A contains a photo-curable component and an inert gas injection portion 28 is provided).
Figure 11:
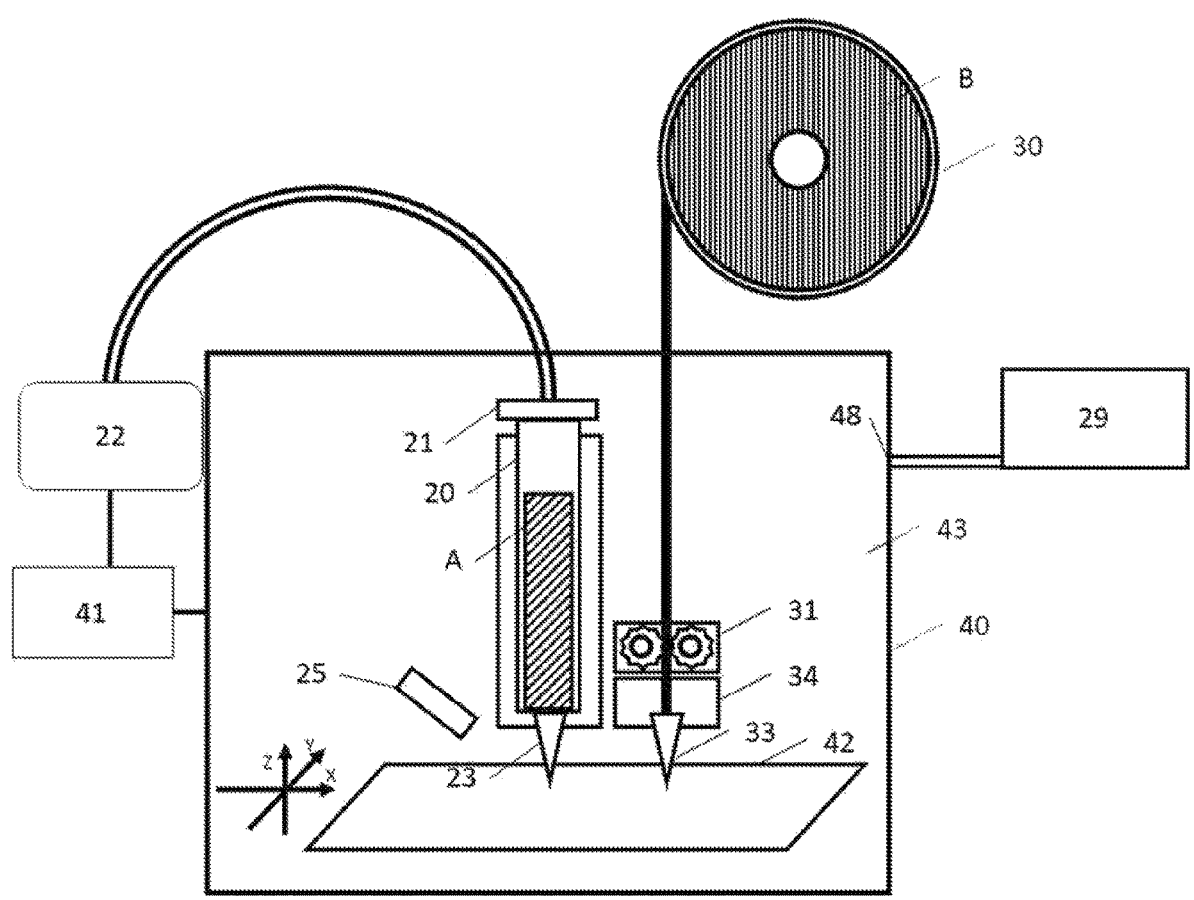
FIG. 11 shows an apparatus for producing a three-dimensional molded product using different types of materials (case where material A contains a photo-curable component, and a decompression pump 29 is provided).

An inert gas atmosphere can be obtained by filling the space surrounding the molding stage (molding area 43) with inert gas, for example, or, as shown in FIG. 10, it is also possible to carry out molding while injecting inert gas to the molding site from an inert gas injection portion 28. As for pressure reduction, pressure inside the molding area 43 can be reduced from the pressure reduction portion 48 by means of a pressure-reducing pump 29 as shown in FIG. 11, for example. Also, a manometer or an oxygen analyzer can be provided to the space surrounding the molding stage to observe the oxygen concentration.

(Unit for Dispensing Molding Material B)

Molding material B is a solid without fluidity at room temperature (25° C.) which can be processed into filaments or pellets for storage. As shown in FIG. 1, molding material B stored in a reservoir portion 30 is pressurized in the pressurizing portion 31, heated in the heating portion 34, and discharged and stacked onto the stage 42 or onto the molded product from the nozzle portion 33 in accordance with the signals from the control computer 41 so as to carry out molding. When using molding material B in the form of filaments, the nozzle portion 30 alone (FIG. 1) may be heated, but when using molding material B in the form of pellets, it is preferable that the pressurizing portion 31 and the nozzle portion 33 be heated at the same time (FIG. 3).

The molding temperature for molding material B can be suitably adjusted in accordance with the properties of the molding material such as the structure and molecular weight, and molding material B is preferably molded at a temperature range of from 60 to 350° C. in view of molding precision, molding speed, and the hardness, strength, and the like of the molded product to be obtained. Also, when molding material B has a melt flow rate (MFR) of from 1 to 400 g/10 min (load: 2.16 kg) at the molding temperature, molding material B can be smoothly dispensed and molding can be carried out with high precision while maintaining good fluidity.

Material B packed in the reservoir portion 30 may be in the form of filaments or pellets. The shape of the reservoir portion 30 can be suitably selected in accordance with the type of the packed material. For example, a material in the form of filaments can be stored by winding the filament onto a spool or the like, and a material in the form of pellets can be stored by packing the material in a container such as a hopper.

A motor, for example, can be used as the power for the pressurizing portion 31 for molding material B. A gear or screw is rotated by the rotation of the motor and molding material B is pressurized. Molding material B is transported from the reservoir portion 30 to the nozzle portion 33 by the pressure applied by the pressurizing portion 31. Although aggressive heating is unfavorable when molding material B is in the form of filaments, when molding material B is in the form of pellets, molding material B is preferably pressurized while being melted by heating.

An electric heater, for example, can be used as the power for the heating portion 34 for molding material B. Heating is controlled by the control computer 41, and molding material B is heated to a prescribed temperature to be used for molding.

The material for the nozzle portion 33 for dispensing molding material B is preferably a metal material, more preferably a material which does not deteriorate due to heating and dispensing of the material. The material can be suitably elected from iron, aluminum, copper, stainless steel, titanium, tungsten carbide, and the like, for example.

It is a feature of the present invention that molding is carried out while bringing the end portion of the nozzle portion 33, i.e., the dispensing outlet, into contact with the dispensed molding material B. Since the dispensing outlet is in contact with the molding material, the molding material can be flattened and the thickness of each layer can be equalized. Although the suitable inner diameter of the dispensing outlet varies depending on the shape and molten viscosity of the molding material, molding temperature, pressure, and the like, but it is preferably from 0.1 to 2.0 mm, more preferably from 0.2 to 1.0 mm in view of the balance between molding precision and molding speed. The pressure applied to the dispensing outlet can be sufficiently reduced and the molding speed will not be reduced when the inner diameter of the dispensing outlet of the nozzle is 0.1 mm or more. Also, sufficient molding precision can be secured when the inner diameter is 2.0 mm or less. It is furthermore preferable that the inner diameter of the dispensing portion and the outer diameter of the end have a circular shape and that the difference between the inner diameter and the outer diameter of the end be as small as possible. For example, a nozzle with an ultrathinned end portion can be mentioned. The difference between the outer diameter and the inner diameter is preferably 2.0 mm or less, more preferably 0.8 mm or less, most preferably 0.5 mm or less. This difference is preferably 2.0 mm or less to obtain good molding precision and to prevent adhesion of the molding material to the periphery of the dispensing outlet.

The outer shape of the nozzle portion 33 for dispensing molding material B may be tapered. Tapering is preferable since it prevents deterioration of the molding precision caused by buildup of the dispensed molding material B. Adhesion of molding material B to the nozzle portion 33 can be reduced by a surface treatment other than tapering, such as liquid-repellent treatment.

The pressurizing portion 31 may include a mechanism for sucking up molding material B by a reverse rotation of the gear or screw during a period when molding material B is not dispensed (standby period). By providing this mechanism, excessive output of the molding material B during standby can be suppressed and molding precision can be improved.

Molding material B is a thermoplastic resin or a thermoplastic resin composition which has good fluidity in a temperature range of from 60 to 350° C. and which can easily be used in high precision molding. Fluidity of a resin at the time of molding is normally evaluated by the melt flow rate (MFR), and molding material B has an MFR value (load: 2.16 kg) in a temperature range of from 60 to 350° C. of from 1 to 400 g/10 min. Molding speed and molding precision can be well balanced when the MFR value is within this range. The MFR value is preferably from 5 to 200 g/10 min, particularly preferably from 10 to 100 g/10 min.

Molding is carried out by dispensing molding material B from the nozzle at a temperature of 60° C. or higher and then solidifying by cooling. It is preferable to heat or retain the heat of the stage 42 when B is directly dispensed onto the stage, and to heat or retain the heat of the molding area 43 in other cases in terms of obtaining a molded product with high precision. Setting temperature (environmental temperature) of 42 and 43 is more preferably within a range of from 40 to 230° C., although it depends on the molding temperature (dispensing temperature) of B, so that the difference between the molding temperature and the environmental temperature will be from 20 to 200° C. The difference between the molding temperature of B and the environmental temperature will be 20° C. or more when the environmental temperature is 40° C. or higher, and B can be rapidly cooled after being dispensed from the nozzle and sufficient molding speed can be ensured. Also, when the environmental temperature does not exceed 200° C., the difference between the molding temperature and the environmental temperature will be 200° C. or less and deformation due to thermal shrinkage of the molded product formed from B can be suppressed. The environmental temperature is more preferably from 20 to 150° C., most preferably from 20 to 100° C.

Molding material B only needs to contain a thermoplastic resin, and polyethylene (PE), polypropylene (PP), vinyl chloride resin (PVC), polystyrene (PS), polylactic acid (PLA), acrylonitrile-butadiene-styrene (ABS), polyethylene terephthalate (PET), polycarbonate (PC), polyamide (PA), polyetherimide (PEI), polyvinyl acetate (PVAC), polyurethane resin (PUR), polytetrafluoroethylene (PTFE), acrylonitrile styrene resin (AS), acrylic resin, polyacetal (POM), polyphenylene oxide (PPO), polybutylene terephthalate (PBT), cycloolefin polymer (COP), polycaprolactone (PCL), polyphenylene sulfite (PPS), polysulfone (PSF), polyethersulfone (PES), polyarylate (PAR), polyether ether ketone (PEEK), polyimide (PI), polyamideimide (PAI), polybutadiene (BR), and the like, can be used as the thermoplastic resin, for example.

Molding material B may contain other functional materials besides a thermoplastic resin, examples of which include glass-based fibers, carbon-based fibers, cellulose-based fibers, woodchip, metal powder, carbon black, calcium carbonate, talc, plasticizers, stabilizers, and colorants.

(Overall Molding Apparatus)

Figure 6:
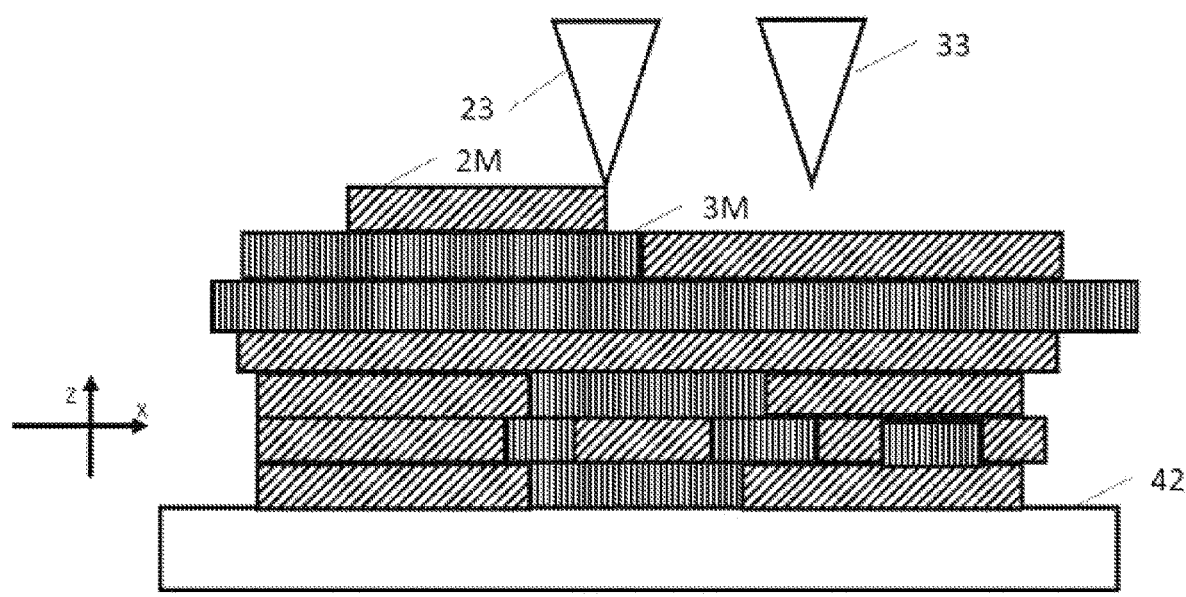
FIG. 6 shows the step of outputting different types of materials, and flattening and stacking the layers at the same time.

Different types of materials A and B may be dispensed in parallel or on a single material basis. From the viewpoint of forming a composite material, it is preferable that all necessary molding materials be output in a molding operation for a single layer before moving on to the output of the next single layer (FIG. 6).

The stage 42 can be relatively moved (relative movement) with respect to the nozzle portion 23 for dispensing material A and the nozzle portion 33 for dispensing material B. The stage 42 preferably consists of a high-strength material, more preferably consists of a material from which a molded product can be easily peeled off after molding. Examples of the material include various metal materials such as stainless steel, glass, and plastic used alone or in the form of a composite material. The mechanism for relatively moving the multiple nozzles with respect to the stage 42 may be provided on the same axis or on a separate axis.

At least one each of a nozzle portion 23 for dispensing material A and a nozzle portion 33 for dispensing material B are provided in the apparatus body 40. These nozzle portions may have separate relative movement mechanisms or may be provided on the same relative movement mechanism.

The relative movement mechanism three-dimensionally moves the stage 42 onto which the molding materials are stacked and the nozzles, and changes the positional relationship between the nozzles and the stage by means of a gear, a screw, a belt, or the like by using a motor as the power. This mechanism may move the nozzles and the components attached thereto, move the stage 42, or move a combination thereof.

The relative movement mechanism preferably has a sensor for limiting the range of movement. The sensor enables prevention of the breakage of the apparatus and determination of an absolute three-dimensional position.

Figure 7:
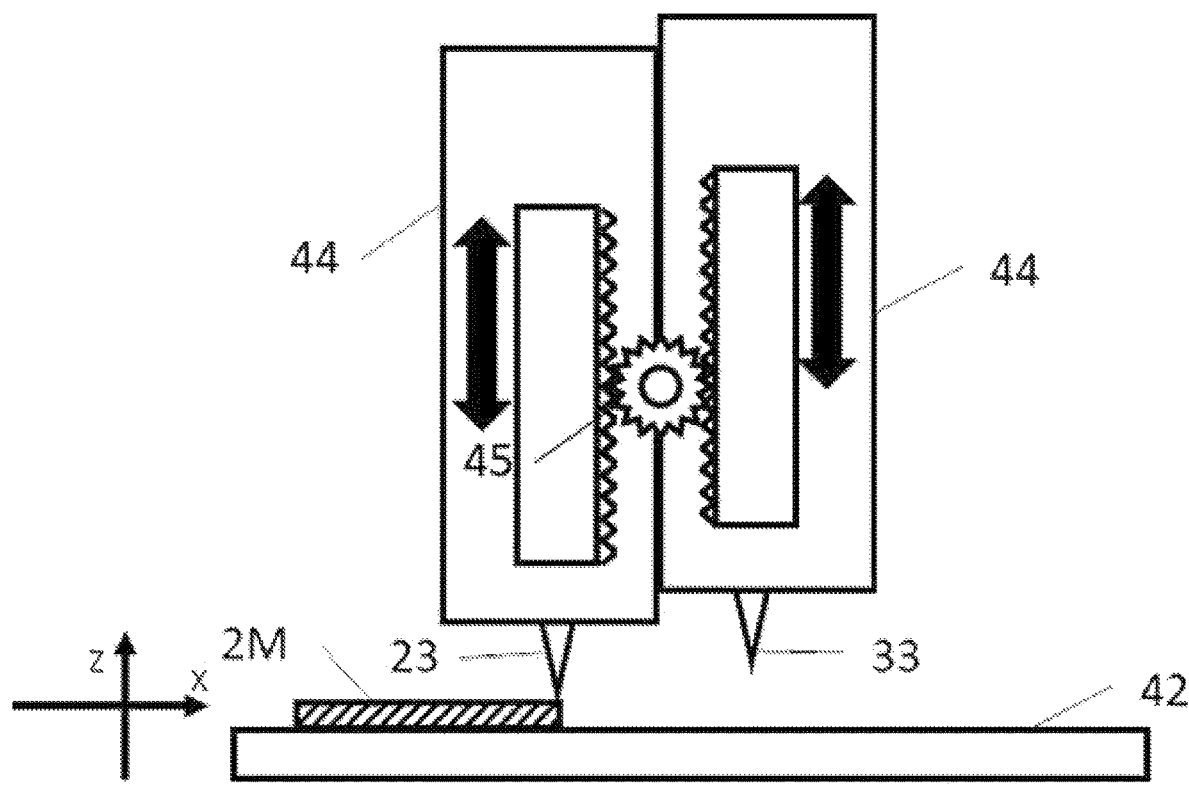
FIG. 7 shows a mechanism for moving the nozzle portions for outputting different types of materials up and down (gear).
Figure 8:
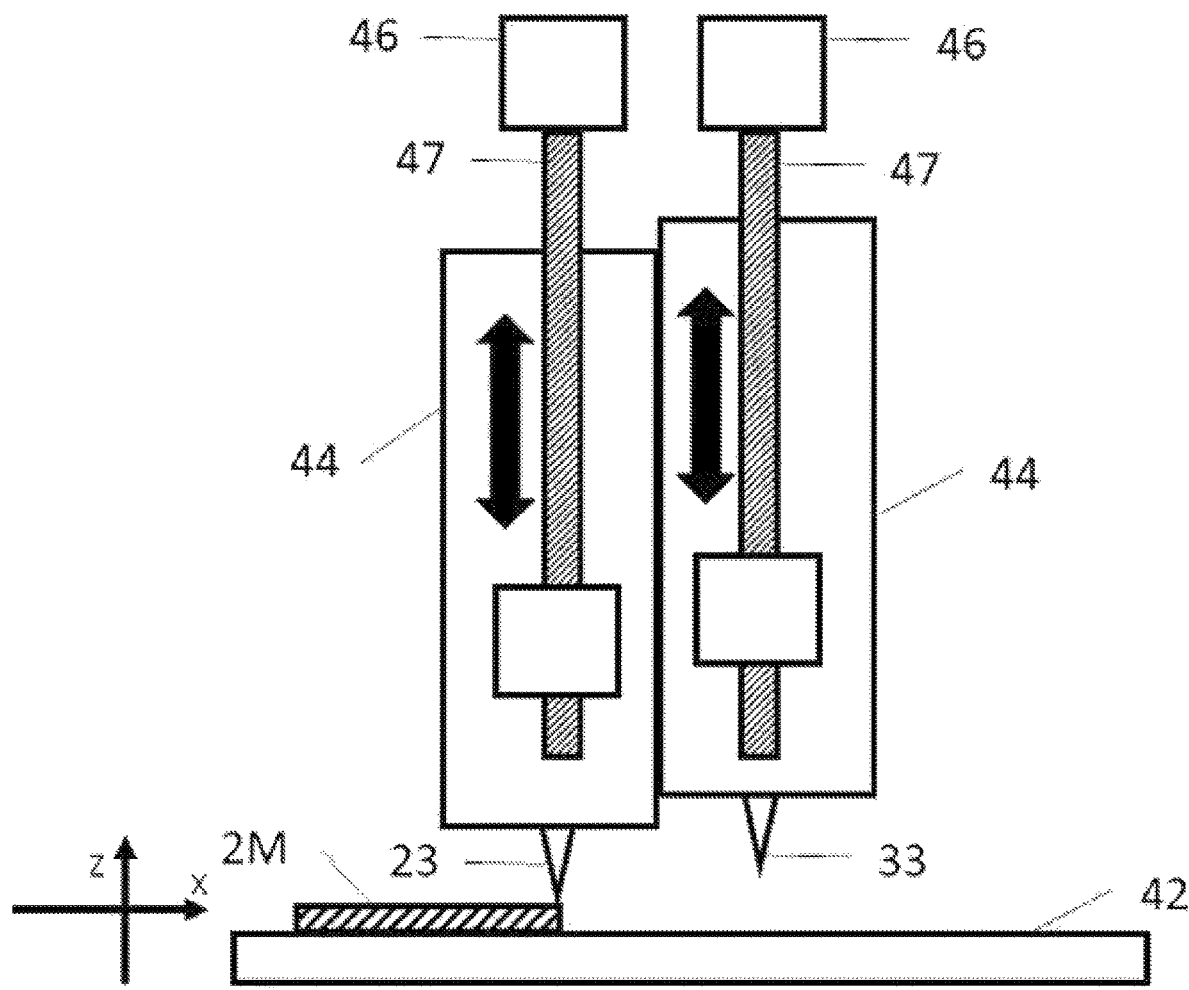
FIG. 8 shows a mechanism for moving the nozzle portions for outputting different types of materials up and down (rotating axis)
Figure 9:
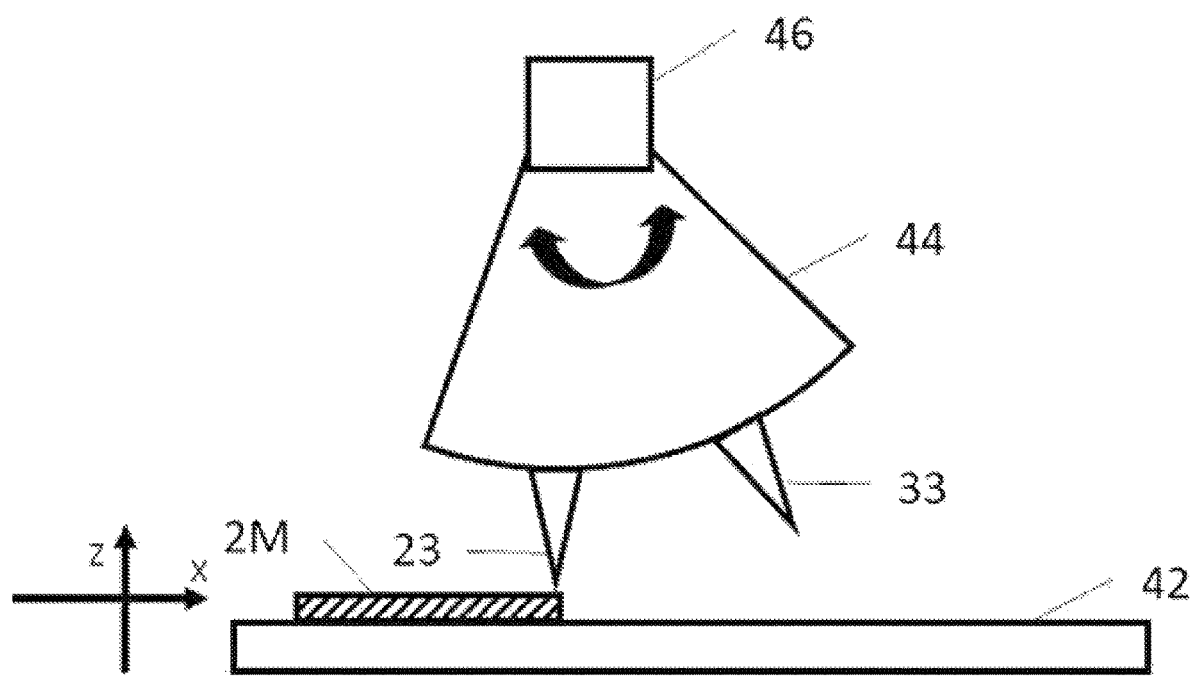
FIG. 9 shows a mechanism for rotating the nozzle portions for outputting different types of materials.

The three-dimensional molding apparatus of the present invention may have the nozzle portions and mechanisms for controlling the nozzle portions as shown in FIGS. 7 to 9, for example. However, the nozzle portions and the mechanisms for controlling the same used in the present invention are not limited to these examples. For example, the control mechanisms operate when switching is required to dispense molding materials from multiple nozzle portions so as to move a non-operating nozzle portion to a position away from the molding surface on the stage 42. This movement prevents excessive molding material from being dispensed onto the molding surface from the non-operating nozzle portion and prevents the contact between the molding surface and the nozzle portion so as to thereby improve molding precision. These mechanisms can also be used for relative position adjustment of the multiple nozzle portions with respect to the stage 42. For example, the height of the stacked surface of the molding materials can be uniformed to thereby improve molding precision. Any mechanism can be used as long as it is capable of moving up and down or rotating the multiple nozzle portions and the portions 44 for controlling the nozzle portions by means of a motor 46 (FIGS. 8 and 9), a servo, a gear 45 (FIG. 7), a screw 47 (FIG. 8), a camlink, rotation (FIG. 9), or the like.

The control computer 41 in the present invention controls the movement of at least the multiple pressurizing portions, heating portions, and relative movement mechanisms. For example, a RepRap system which is an open source can be used, and molding can be performed by using known slicer software and frontend software.

The control computer 41 can also control the movement of the light irradiation portion 25, multiple nozzle portions that are not included in the relative movement mechanism(s), and their control mechanism. A comprehensive unified control suppresses clogging of the nozzle portions, accelerates curing of material A, adjusts the height of the nozzle portions, and improves molding precision.

Data can be input into the control computer 41 also by reading the data recorded in external recording media such as SD cards, or by connecting the control computer 41 to a PC or the like via a wired connection using a USB cable etc. or via a wireless connection using WiFi etc.

Embodiments of the present invention will be explained below by reference to the figures. However, embodiments of the present invention are not limited to these examples.

Abbreviations for the compounds in the examples and comparative examples of the present invention are as follows.

UA-1: Bifunctional urethane oligomer (having acrylic groups at both ends, viscosity at 20° C.: 510 Pa·s, viscosity at 60° C.: 49 Pa·s, viscosity at 100°: 6.8 Pa·s)

UA-2: Bifunctional urethane oligomer (having acrylic groups at both ends, viscosity at 85° C.: 20 Pa·s)

UA-3: Hexafunctional multi-branched urethane oligomer (having acrylic groups at both ends, viscosity at 100° C.: 160 Pa·s)

UA-4: Bifunctional urethane oligomer (having acrylic groups at both ends, viscosity at 110° C.: 300 Pa·s)

1173: Photopolymerization initiator Omnirad 1173 (manufactured by IGM Resins)

TPO: Photopolymerization initiator Omnirad TPO (manufactured by IGM Resins)

ACMO: Acryloyl morpholine (manufactured by KJ Chemicals, registered trademark "ACMO", registered trademark "Kohshylmer", viscosity: 0.012 Pa·s (20° C.))

PEA: Phenoxyethyl acrylate (manufactured by Osaka Organic Chemical Industry, Viscoat 192, viscosity: 0.009 Pa·s (20° C.))

PLA: PolyPlus PLA (manufactured by Polymaker, MFR: 7 to 11 g/10 min (210° C., load: 2.16 kg))

PVA: AquaSolve-PVA (manufactured by FORMFUTURA, MFR: 14 to 20 g/10 min (190° C., load: 2.16 kg))

ABS: ABS resin (PolyLite ABS, manufactured by polymaker, MFR: 9 to 14 g/10 min (220° C., load: 2.16 kg))

PC: PC resin (PolyMax PC, manufactured by polymaker, MFR: 6 to 8 g/10 min (260° C., load: 1.2 kg))

Nylon: Nylon resin (Nylon 12, manufactured by Kodak, MFR: 38 g/10 min (220° C., load: 10 kg))

Physical properties and the like were evaluated by the methods below with the use of molded products obtained in the examples and comparative examples of the present invention.

<Tensile Strength, Elongation at Break>

The molded products obtained in the examples and comparative examples were punched into No. 3 dumbbell shapes according to JIS K6251 to obtain dumbbell-shaped specimens, and the specimens were subjected to a tensile test according to JIS K7161 with the use of a desktop precision universal testing machine (manufactured by Shimadzu Corp., Autograph AGS-X). The test was carried out at a tensile rate of 10 mm/min and a grip distance of 50 mm, and the measurement values for five specimens were averaged to obtain the tensile strength (strength) and the elongation at break (elongation).

<Molding Precision>

After molding, the size of the molded product was precisely measured and compared with the preset value to evaluate the molding precision.

⊙: Additive manufacturing was achieved, and the external dimension of the molded product was 99 to 101% of the preset value ○: Additive manufacturing was achieved, and the external dimension of the molded product was 95 to 105% of the preset value Δ: Additive manufacturing was achieved, but deformation, distortion, etc. of the molded product were observed, and the external dimension was less than 95% or exceeded 105% of the molding data ×: Intended molded product was not obtained <Quality Evaluation>

After molding, the exterior and cross-section of the molded product were observed to evaluate the quality of the product based on the presence of stacking traces, air bubbles, etc.

⊙: Almost no staking traces were observed, and almost no air bubbles or defects were observed ○: Stacking traces were observed, but almost no air bubbles or defects were observed Δ: Obvious stacking traces were observed, and obvious air bubbles and defects were observed ×: Irregularities of stacked layers were observed throughout the molded product, and numerous air bubbles and defects were observed Embodiment 1

In an embodiment of the present invention, different types of materials A and B are used and stacked to produce a three-dimensional molded product. As shown in FIG. 1, a three-dimensional molding apparatus which uses a syringe pump as the output mechanism of material A and which comprises a reservoir portion 20 for storing A, a pressurizing portion 21 for applying pressure to A, a pressurization controller portion 22, a nozzle portion 23 for dispensing A, and a heating portion 24 for heating the reservoir portion 20 and the nozzle portion 23;

a reservoir portion 30 for material B, a nozzle portion 33 for dispensing B, and a heating portion 34 and a pressurizing portion 31 related to B;

a stage 42 onto which the molding materials dispensed from the dispensing outlets of the multiple nozzle portions are stacked, and a relative movement mechanism(s) for three-dimensionally relatively moving the stage 42 with respect to the nozzle portion 23 and the nozzle portion 33;

and a control computer 41 for controlling the movement of the multiple pressurizing portions, heating portions, and relative movement mechanisms was used. The control computer 41 uses a RepRap system, and the control computer 41 is connected to a PC with a USB cable to send the data concerning molding conditions from the PC to the control computer 41.

The control computer 41 controls the heating portions and the pressurizing portions to perform heating and pressurization in accordance with the data sent from the PC, and dispenses different materials A and B from the respective nozzles 23 and 33 onto the stage 42 and stacks the materials while solidifying the same as shown in FIG. 6. At this point, the end portions of 23 and 33 are in contact with the dispensed A and B so that molding is carried out while smoothing the molding surface. Thickness of the molded layers can be precisely controlled and high precision molding can be realized thereby.

EXAMPLE 1

A coating chocolate (manufactured by Kyoritsu Foods, viscosity: 42 Pa·s (33° C.)) was used as material A, and the reservoir portion 20 and the nozzle portion 23 (dispensing outlet inner diameter: 2.0 mm, outer diameter: 4.0 mm) were heated to 40° C. PolyPlus PLA (manufactured by Polymaker, MFR: 7 to 11 g/10 min (210° C., load: 2.16 kg)) was used as material B, and the heating portion 34 and the nozzle portion 33 (dispensing outlet inner diameter: 0.5 mm, outer diameter: 2.0 mm) were heated to 210° C. The environmental temperature of the molding area 43 was set at 10° C., the stacking thickness of A and B was set to 0.6 mm and 0.2 mm, respectively, and molding was carried out in accordance with the prescribed molding speed, pressure, molding pattern, and the like for each material. Each of A and B dispensed onto the stage 42 was cooled and solidified after being dispensed. This operation was performed for each layer, and the layers were further stacked to thereby produce a cylindrical molded product composed of an outer wall made of 3M and an inner portion made of 2M having a diameter of 20 mm and a length of 50 mm (outer wall thickness: 5 mm) with high precision.

Embodiment 2

As shown in FIG. 4, an apparatus which uses a gear pump as the output mechanism for A and which comprises a reservoir portion 20 for storing A, a pressurizing portion 21 for applying pressure to A, a pressurization controller portion 22, a nozzle portion 23 for dispensing A, and a heating portion 24 for heating the reservoir portion 20 and the nozzle portion 23 was used. A dispensing unit for materials in the form of pellets was used as the output mechanism for B as shown in FIG. 4.

EXAMPLE 2

The three-dimensional molding apparatus of Embodiment 2 was used, 1-octadecanol (melting point: 59° C., manufactured by Tokyo Chemical Industry, viscosity: 0.013 Pa·s (60° C.)) was used as material A, and the reservoir portion 20 and the nozzle portion 23 (dispensing outlet inner diameter: 0.05 mm, outer diameter: 0.08 mm) were heated to 60° C. The PLA used in Example 1 was used in the form of pellets as molding material B, and the heating portion 34 and the nozzle portion 33 (dispensing outlet inner diameter: 0.4 mm, outer diameter: 1 mm) were heated to 210° C. The environmental temperature of the molding area 43 was set at 20° C., the thickness of each of the stacked layers of A and B was set to 0.2 mm, and molding was carried out in the same manner as in Example 1 in accordance with prescribed conditions to produce a rectangular molded product (length: 100 mm, width: 40 mm, height: 10 mm) with high precision by alternately stacking the layers of 2M and 3M. The obtained molded product was cut into two halves (length: 50 mm, width: 40 mm, height: 10 mm) to visually confirm that the layers of 2M and 3M were uniformly adhered and stacked with no air bubbles, defects, or the like. Also, no obvious stacking scars were confirmed on the surface of the molded product.

Embodiment 3

As shown in FIG. 2, the three-dimensional molding apparatus of Embodiment 1 to which a light irradiation portion 25 was further provided was used. When material A contains a photo-curable component, material A can be cured after being dispensed from the nozzle portion 23 by the light irradiation from 25.

Also, as shown in FIG. 10, an inert gas injection portion 28 can be provided. Curing reaction by radical polymerization of material A containing a photo-curable component rapidly proceeds by injecting an inert gas such as nitrogen to the light irradiation area, and it is therefore advantageous for enhancing the molding speed and improving the molding precision. An inert gas is blown out at a pressure which does not deform the uncured molded product. The pressure depends on the types and physical properties of the molding material, but it is normally set at 50 kPa or less.

A nozzle curing prevention portion 27 can be further provided as shown in FIG. 5. Provision of 27 is preferable to easily adjust the irradiation area of the light from the irradiation portion 25, and to thereby suppress troubles such as clogging of the nozzle end and dispense failure and to improve molding precision.

EXAMPLE 3

A three-dimensional molding apparatus having a light irradiation portion 25 of Embodiment 3 as shown in FIG. 2 was used. As material A, a mixture of 49 parts by mass of acryloyl morpholine (manufactured by KJ Chemicals, registered trademark "ACMO", registered trademark "Kohshylmer"), 49 parts by mass of phenoxyethyl acrylate, and 2 parts by mass of a photopolymerization initiator Omnirad TPO (manufactured by IGM Resins) was prepared. The viscosity of material A at 20° C. was 0.011 Pa·s. The dispensing temperature of A was set at 20° C., a nozzle portion 23 with a dispensing outlet having an inner diameter of 0.1 mm and an outer diameter of 0.13 mm was used, and a UV-LED (405 nm) light source was used as the light irradiation portion. As material B, AquaSolve-PVA (manufactured by FORMFUTURA, MFR: 14 to 20 g/10 min (190° C., load: 2.16 kg)) was used, and the heating portion 34 and the nozzle portion 33 (dispensing outlet inner diameter: 1.0 mm, outer diameter: 2.0 mm) were heated to 190° C. The environmental temperature was set at 20° C., the thickness of each of the stacked layers of A and B was set to 0.2 mm, and molding was carried out in accordance with the prescribed molding speed, pressure, molding pattern, and the like for each material. A dispensed onto the stage 42 was cured by light irradiation from 25, and B was solidified by cooling after dispensing. This operation was performed for each layer and repeated to stack the layers so as to produce a rectangular molded product (length: 100 mm, width: 20 mm, height: 2 mm) with high precision by alternately stacking the layers of 2M and 3M.

EXAMPLE 4

A mixture of 98 parts by mass of a bifunctional urethane oligomer (UA-1, viscosity at 100° C.: 6.8 Pa·s) and 2 parts by mass of a photopolymerization initiator Omnirad 1173 (manufactured by IGM Resins) was used as material A. The reservoir portion 20 and the nozzle portion 23 (dispensing outlet inner diameter: 0.6 mm, outer diameter: 0.7 mm) were heated to 100° C. A Hg—Xe lamp was used as the light source. As molding material B, the same PLA as the one used in Example 1 was used, the nozzle portion 33 was heated to 210° C., and a nozzle portion 33 with an inner diameter of 0.4 mm and an outer diameter of 2.0 mm was used. The thickness of the stacked layers of each of A and B was set to 0.16 mm, and molding was carried out at an environmental temperature of 60° C. At this time, a nozzle curing prevention portion 27 was attached to the nozzle portion 23 as shown in FIG. 5. The diameter φL (outer diameter) of the end of the nozzle portion 23 (dispensing outlet) was 0.13 mm, and the diameter φM of the circle of the non-irradiated area that is not irradiated with light due to the nozzle curing prevention portion 27 was 5 mm. The diameter φN of the circle of the maximum area irradiated by the light irradiation portion 25 was 30 mm In other words, the area irradiated by the combination of 23, 25, and 27 was a circular ring with a diameter of 25 mm (φN–φM). In accordance with the aforementioned prescribed conditions, molding material A was cured by the ultraviolet light (UV) emitted from the LED light source while being dispensed on to the stage 42, and the PLA resin used as molding material B was solidified by cooling after being dispensed as in Example 1.

Any molding method, such as a molding method in which the molding materials A and B of the present invention are alternately stacked layer by layer, a molding method in which a few layers of A are stacked and then a few layers of B are stacked, or a molding method in which A and B are used in the same layer and the layers are stacked, can be set and carried out by the molding apparatus of the present invention. For example, molding was carried out as described below by using the materials A and B of Example 4 at an environmental temperature of 60° C.

Material A was dispensed and stacked along the X axis direction shown in FIG. 2 in a thickness of 0.13 to 0.14 mm/layer to obtain a molded product 2M consisting of material A having a length (Y axis direction) of 100 mm, a width (X axis direction) of 20 mm, and a height (Z axis direction) of 0.67 to 0.68 mm. Material B was dispensed and stacked onto the obtained sheet-like molded product of 2M along the Y axis direction in a thickness of 0.22 to 0.23 mm/layer to obtain a composite material molded product consisting of the molded products 2M and 3M having a height of 1.34 to 1.35 mm. Furthermore, material A was similarly molded onto the composite material molded product of 2M and 3M in the direction of the X axis to obtain a three-layer molded product AxByAx of different types of materials with a length of 100 mm, a width of 20 mm, and a height of 2 mm. Moreover, three-layer molded products AxBxAx and AxB45Ax each having a length of 100 mm, a width of 20 mm, and a height of 2 mm were obtained by molding both of materials A and B in the direction of the X axis, and by molding A in the direction of the X axis and B in an oblique direction (at 45° to the X axis).

COMPARATIVE EXAMPLE 1

By using a three-dimensional molding apparatus (P) having an output mechanism, a reservoir portion, a liquid-sending unit, a temperature control unit, a nozzle portion, a light irradiation portion, a control computer, a stage, etc. related to material A, and by using the same material A as the one used in Example 4, molding was carried out in the direction of the X axis according to the same molding conditions as in Example 4 to obtain a rectangular molded product (length: 100 mm, width: 20 mm, height: 2 mm).

COMPARATIVE EXAMPLE 2

By using a three-dimensional molding apparatus (Q) having an output mechanism, a reservoir portion, a liquid-sending unit, a temperature control unit, a nozzle portion, a control computer, and a stage, etc. related to material B, and by using the same material B as the one used in Example 3, molding was carried out in the directions of the X axis, Y axis, and Z axis according to the same molding conditions as in Example 3 to obtain a rectangular molded product (length: 100 mm, width: 20 mm, height: 2mm).

Each of the molded product obtained in Example 4 and Comparative Examples 1 and 2 was cut into two halves (length: 50 mm, width: 20 mm, height: 2 mm) and the cross-section was observed with an optical microscope (10×) to evaluate molding quality. Molding precision was also evaluated, and strength and elongation were also evaluated by means of tensile test. The evaluation results are shown in Table 1.

EXAMPLES 5 TO 11

In Example 5, a molded product shown in FIG. 6 (length: 100 mm, width: 20 mm, height: 2 mm) was produced by using the same materials A and B as those used in Example 4 and by using the same apparatus and molding conditions as in Example 4. Examples 6 to 11 were carried out by using the same apparatus as in Example 4 and by using the materials and conditions shown in Table 2 to obtain molded products having a length of 100 mm, a width of 20 mm, and a height of 2 mm. The compositions of the different types of materials, the molding conditions, and the evaluation results of the molded products of Examples 3 and 5 to 11 are shown in Table 2. In Examples 6 to 11, molding of A and B was carried out in the direction of the Y axis.

COMPARATIVE EXAMPLE 3

By using the same material A as the one used in Example 3 and by applying the same molding conditions as in Example 3, molding was carried out in the direction of the X axis by using the three-dimensional molding apparatus P related to A to produce a rectangular molded product (length: 100 mm, width: 20 mm, height: 2 mm). The resin immediately after being dispensed easily spread as layers of the obtained molded product were stacked, and the molding precision was low. Also, irregularity was confirmed on the surface of the obtained molded product, and the quality was low. Inner observation and tensile test could not be performed since the molded product broke when cut into two halves and when punching out dumbbell-shaped specimens for the tensile test.

COMPARATIVE EXAMPLES 4 to 7

By using the materials for material B shown in Table 3 and by using the three-dimensional molding apparatus Q related to B, molding was carried out by stacking layers under the prescribed conditions to produce rectangular molded products (length: 100 mm, width: 20 mm, height: 2 mm). The molding precision and quality of the obtained molded products were evaluated, and a tensile test was performed. Results of the evaluations and the tests are shown in Table 3.

COMPARATIVE EXAMPLE 8

Two sheets of rectangular molded products (length: 100 mm, width: 20 mm, height: 2 mm) obtained by molding Comparative Example 1 and Comparative Example 2 in the direction of the Y axis were stacked on top of one another and shaped into a height of 2 mm with the use of a hot pressing machine (200° C.). After cooling, the obtained pressed product was cut into a size with a length of 100 mm, a width of 20 mm, and a height of 2 mm. Quality of the cut product was evaluated by a like manner to find air bubbles, defects, and unadhered portions at the interface between A and B. A tensile test was performed, and the results are shown in Table 3.

The results of Examples 3 to 11 and Comparative Examples 3 to 7 show that even with the materials that cannot be molded with high precision and high quality by an ordinary three-dimensional molding apparatus that handles a single material (A or B), since different types of materials can be used in the three-dimensional molding apparatus of the present invention, molding precision and quality of the molded product were improved and mechanical properties of the molded product were enhanced by combination, composite, etc. of different types of materials A and B. This is considered to be a result of a unique effect due to synergistic effects of the different types of materials in the same layer or in different layers. For example, when a low-viscosity material A is dispensed onto a layer molded with a different type of material B, spreading before curing can be suppressed. Also, when dispensing A around material B which has a high molten viscosity, the spaces and stacking scars formed by material B can be filled with A. Quality of the molded product can be improved, strength and elongation can be enhanced, and, in particular, the problem of strength anisotropy (low strength in the stacking direction) specific to FDM materials can be improved thereby.

Comparison of the results in Tables 1 to 3 reveal that the additive manufactured product obtained by using the different types of materials A and B had higher strength than the molded products consisting of a single material A or B and higher elongation than the molded products consisting of a single material B. It can also be confirmed that molded products consisting of different types of materials had superior molding precision and quality compared to molded products consisting of a single material A or B. In the case where a single material A was used alone, when layers of a single soft material, a single low-viscosity material, or a single active ray-curable material was stacked, no interlayer spaces were left after solidification or curing and stacking scars remaining on the surface of the molded product were suppressed since the material is fluid before solidification or curing, but when layers of a high-viscosity material or a rapidly solidifying or curing material were stacked, air bubbles, defects, and the like were likely to remain in the molded product. On the other hand, in the case where a single material B was used alone, although air bubbles, defects, and the like in the molded product were suppressed by heating a single material having high molten viscosity or high melting point or a single material having high hardness and strength to a temperature that gives a certain fluidity and dispensing and stacking the material in a semi-molten state, since the material rapidly loses fluidity after being dispensed, spaces remained between layers after solidification and stacking scars were likely to remain on the surface and inside the molded products. Molding using different types of materials according to the present invention allows the materials to fully exert their properties to overcome the drawbacks and to realize well balanced molding by the synergistic effects of the materials. Also, molded products having good strength and elongation and excellent quality can be molded with high precision. In addition, the drawbacks of conventional FDM molded products, i.e., Comparative Examples 3 to 7, which lie in low strength particularly in the stacking direction and easiness to break were obviously improved by introducing different types of materials, and utility of the molded products was obviously improved. Different types of materials can be contacted as much as possible and full exertion of synergistic effects of the materials can be achieved by alternately stacking of different types of materials little by little with the use of the molding apparatus of the present invention, then it results that the molded products with improved moldability can be obtained by using different types of materials. Therefore, it is possible to obtain molded products having excellent mechanical properties such as strength and elongation with using the three-dimensional molding apparatus, as compared with the pasting of the shaped moldings obtained with each material (Comparative Example 8).

Also, by providing a nozzle curing prevention portion, the end of the nozzle for dispensing material A is prevented from direct light irradiation, and clogging of the nozzle portion, adhesion of cured molding material A to the nozzle end, stringing of material A during standby period, and the like were improved thereby.

TABLE 1

|  |  |  | Example 4 |  | Comparative Example 1 |  | Comparative Example 2 |  |
|---|---|---|---|---|---|---|---|---|
| Material A | Composition (mass) | | UA-1(98) 1173(2) | | UA-1(98) 1173(2) | | — | |
| | Molding temp (° C.) | | 100 | | 100 | | — | |
| | Viscosity (Pa · s) | | 6.8 | | 6.8 | | — | |
| | Nozzle (mm) | Inner diameter | 0.6 | | 0.6 | | — | |
| | | Outer diameter | 0.7 | | 0.7 | | — | |
| | Curing prevention portion | | Provided | | Provided | | — | |
| | ΦM(mm) | | 5 | | 5 | | — | |
| | ΦN(mm) | | 30 | | 30 | | — | |
| | Molding direction | X axis | X axis | X axis | X axis | | — | |
| | Light source | | UV-LED | | UV-LED | | — | |
| Material B | Resin | | PLA | | — | | PLA | |
| | Molding temp (° C.) | | 210 | | — | | 210 | |
| | Environmental temp (° C.) | | 60 | | — | | 60 | |
| | Nozzle (mm) | Inner diameter | 0.4 | | — | | 0.4 | |
| | | Outer diameter | 2.0 | | — | | 2.0 | |
| | Molding direction | Y axis | X axis | 45° to X axis | — | Y axis | X axis | 45° to X axis |
| Molded product | Abbreviation | AxByAx | AxBxAx | AxB45Ax | — | — | — | — |
| | Strength (Mpa) | 45 | 37 | 44 | 1.5 | 33 | 28 | 30 |
| | Elongation (%) | 22 | 18 | 28 | 130 | 11 | 2.1 | 8 |
| | Molding precision | ⊙ | ⊙ | ⊙ | Δ | Δ | Δ | Δ |
| | Quality | ⊙ | ⊙ | ⊙ | Δ | X | X | X |

TABLE 2

| | Examples | 3 | 5 | 6 | 7 | 8 | 9 | 10 | 11 |
|---|---|---|---|---|---|---|---|---|---|
| Material A | Composition (mass) | ACMO (49) PEA (49) TPO (2) | UA-1 (98) 1173 (2) — | UA-2 (98) 1173 (1) TPO (1) | UA-3 (97) TPO (3) — | UA-4 (95) 1173 (2) TPO (3) | ACMO (50) POA (49.5) TPO (0.5) | UA-3 (98) TPO (2) — | UA-4 (60) ACMO (38) TPO (2) |
| | Molding temp (° C.) | 20 | 100 | 85 | 85 | 110 | 20 | 85 | 60 |
| | Viscosity (Pa · s) | 0.011 | 6.8 | 20 | 115 | 300 | 0.011 | 115 | 8 |
| | Nozzle Inner diameter (mm) | 0.10 | 0.6 | 0.52 | 1.25 | 2.27 | 0.03 | 1.0 | 0.6 |
| | Outer diameter | 0.13 | 0.7 | 0.82 | 2.25 | 2.77 | 0.13 | 1.5 | 0.7 |
| | Curing prevention portion | Not provided | Provided | Provided | Provided | Provided | Provided | Not provided | Provided |
| | ΦM(mm) | — | 5 | 40 | 4 | 3 | 13 | — | 3 |
| | ΦN(mm) | — | 30 | 65 | 60 | 15 | 20 | — | 40 |
| | Light source | Hg—Xe | UV-LED | UV-LED | Hg—Xe | UV-LED | UV-LED | Hg—Xe | UV-LED |

TABLE 2-continued

| Examples | | 3 | 5 | 6 | 7 | 8 | 9 | 10 | 11 |
|---|---|---|---|---|---|---|---|---|---|
| Material B | Resin | PVA | PLA | ABS | PC | Nylon | PLA | PC | PLA |
| | Molding temp (° C.) | 190 | 210 | 250 | 255 | 250 | 210 | 255 | 210 |
| | Environmental temp (° C.) | 60 | 20 | 90 | 90 | 45 | 40 | 90 | 40 |
| | Nozzle    Inner diameter | 1.0 | 0.4 | 0.4 | 0.2 | 2.0 | 0.5 | 0.4 | 0.4 |
| | (mm)      Outer diameter | 2.0 | 2.0 | 1.0 | 1.0 | 4.0 | 2.0 | 1.0 | 2.0 |
| Molded product | Strength (Mpa) | 45 | 35 | 45 | 78 | 43 | 37 | 68 | 44 |
| | Elongation (%) | 11 | 35 | 6 | 19 | 5 | 12 | 15 | 22 |
| | Molding precision | ○ | ⊙ | ○ | ⊙ | ⊙ | ○ | ○ | ⊙ |
| | Quality evaluation | ○ | ⊙ | ⊙ | ⊙ | ○ | ⊙ | ○ | ⊙ |

TABLE 3

| Comparative Examples | | 3 | 4 | 5 | 6 | 7 | 8 |
|---|---|---|---|---|---|---|---|
| Material A | Composition (mass) | ACMO(49) PEA(49) TPO(2) | — | — | — | — | UA-1(98) 1173(2) — |
| | Molding temp (° C.) | 20 | — | — | — | — | — |
| | Viscosity (Pa · s) | 0.011 | — | — | — | — | — |
| | Nozzle   Inner diameter | 0.10 | — | — | — | — | — |
| | (mm)     Outer diameter | 0.13 | — | — | — | — | — |
| | Curing prevention portion | Not provided | — | — | — | — | — |
| | Light source | Hg—Xe | — | — | — | — | — |
| Material B | Resin | — | PVA | ABS | PC | Nylon | PLA |
| | Molding temp (° C.) | — | 190 | 250 | 255 | 250 | — |
| | Environmental temp (° C.) | — | 60 | 90 | 90 | 45 | — |
| | Nozzle   Inner diameter | — | 1.0 | 0.4 | 0.2 | 2.0 | — |
| | (mm)     Outer diameter | — | 2.0 | 1.0 | 1.0 | 4.0 | — |
| Molded product | Strength (Mpa) | — | 37 | 33 | 60 | 40 | 24 |
| | Elongation (%) | — | 10 | 2.7 | 12 | 3 | 1.6 |
| | Molding precision | X | Δ | ○ | X | Δ | X |
| | Quality evaluation | Δ | X | X | Δ | X | X |

REFERENCE SIGNS LIST

A Molding material having a dispensing temperature of from 20 to 150° C. and a dispensing viscosity of from 0.01 to 1000 Pa·s
20 Reservoir portion
21 Pressurizing portion
22 Pressurization controller portion
23 Nozzle portion
24 Heating portion
25 Light irradiation portion
27 Nozzle curing prevention portion
28 Inert gas injection portion
29 Pressure reducing pump
B Molding material having a dispensing temperature of from 60 to 350° C. and a melt flow rate (MFR) at the dispensing temperature of from 1 to 400 (g/10 min, load: 2.16 kg)
30 Reservoir portion
31 Pressurizing portion
33 Nozzle portion
34 Heating portion
40 Apparatus body
41 Control computer
42 Stage
43 Molding area
44 Nozzle control portion
45 Gear
46 Motor
47 Screw
48 Pressure reduction portion

INDUSTRIAL APPLICABILITY

As explained above, the three-dimensional molding apparatus of the present invention which allows additive manufacturing of two or more different types of materials can be used as a 3D printer, and molded products composed of different types of materials can be produced with high precision in a broad field by appropriately combining various types of materials. Also, by the three-dimensional molding method of the present invention, three-dimensional molded products having various physical properties and shapes can be easily and industrially produced as industrial articles, household articles such as writing materials and stationery, medical products, and the like from different types of materials.

The invention claimed is:

1. A three-dimensional molding apparatus using two or more molding materials, the materials being at least a material A and a material B, the apparatus comprising:

reservoirs configured to store the molding materials, dispensing nozzles configured to dispense all the molding materials, wherein ends of each of the dispensing nozzles are set to be in contact with a molding surface while molding, liquid transporters configured to transport the materials from the reservoirs to the dispensing nozzles, temperature controllers,
a molding stage,
a relative movement mechanism, including a motor, configured to three-dimensionally relatively move the stage and the two or more dispensing nozzles, and
a computer configured to control the liquid transporters, the temperature controllers, and the relative movement mechanism.

2. The three-dimensional molding apparatus according to claim 1, wherein the apparatus is configured to dispense material A and material B simultaneously or in turn, at a dispensing temperature of the material A of from 20° C. to 150° C., and a dispense viscosity of the material A of from 0.01 to 1000 Pa·s.

3. The three-dimensional molding apparatus according to claim 1, wherein a dispensing method of the material A is one or more selected from a syringe method, a volumetric dosing method, a tubing method, and a plunger method.

4. The three-dimensional molding apparatus according to claim 1, wherein the liquid transporter for the material A is one or more quantitative liquid transporters selected from a quantitative syringe pump liquid transporter, a quantitative gear pump liquid transporter, a quantitative tube pump liquid transporter, and a quantitative dispense valve liquid transporter.

5. The three-dimensional molding apparatus according to claim 1, wherein a dispensing temperature of the material B is from 60° C. to 350° C., and a melt flow rate (MFR) of the material B at the dispensing temperature is from 1 to 400 (g/10 min, load: 2.16 kg).

6. The three-dimensional molding apparatus according to claim 1 further comprising a light source.

7. The three-dimensional molding apparatus according to claim 6, wherein the nozzle dispensing the configured to dispense material A further comprises a wall configured to prevent curing of dispensed material at the nozzle by blocking light from the light source from reaching the nozzle, and wherein the wall does not contact the molding surface when the nozzle to dispense material A is in contact with the molding surface.

8. The three-dimensional molding apparatus according to claim 7, wherein the nozzle is configured to define an irradiation area of a light emitted from the light source, and the irradiation area is a circle concentric with an end of the nozzle portion for dispensing the material A, the circle having a diameter ranging from 1 to less than 100 times a diameter of the end of the nozzle portion for dispensing the material A.

9. A method of using the three-dimensional molding apparatus of claim 1, the method comprising operating the apparatus to dispense a material A and a material B simultaneously or in turn onto a stage so as to form same or different layers and stack the layers at the same time, to produce a three-dimensional molded product.

10. The method according to claim 9, wherein molding is carried out while bringing an end(s) of a nozzle(s) for dispensing the material A and/or the material B into contact with the material(s) dispensed from each nozzle.

11. The method according to claim 9, wherein two or more molding materials comprise at least one material A and at least one material B, the material A is molded at a molding temperature ranging from 20° C. to 150° C., and a viscosity of A at the molding temperature is from 0.01 to 1000 Pa·s.

12. The method according to claim 9, wherein the material B is molded at a molding temperature ranging from 60° C. to 350° C., and a melt flow rate (MFR) of B at the molding temperature is from 1 to 400 (g/10 min, load: 2.16 kg).

13. The method according to claim 9, wherein the material (A) is a resin composition comprising 10% by mass or more of a photo-curable component.

14. The method according to claim 9, wherein the material A is cured by light irradiation while being dispensed from the nozzle at a temperature of 20° C. or higher.

15. The method for producing a three-dimensional molded product according to claim 9, wherein the material B is dispensed from the nozzle at a temperature of 60° C. or higher and then is solidified by cooling.

16. The three-dimensional molding apparatus of claim 1, wherein the dispensing nozzles are configured to smooth the molding surface when the ends of the dispensing nozzles are in contact with the molding surface.

17. The three-dimensional molding apparatus of claim 6, wherein the material A is a resin composition comprising 10% by mass or more of a photo-curable component.

18. The three-dimensional molding apparatus of claim 7, wherein the wall configured to prevent curing of dispensed material at the nozzle by blocking light from the light source is fixed to the nozzle to dispense material A whereby they can be moved integrally as one piece.

19. A three-dimensional molding apparatus using two or more molding materials, the materials being at least a material A and a material B, the apparatus comprising:
reservoirs configured to store the molding materials,
dispensing nozzles configured to dispense all the molding materials, wherein ends of each of the dispensing nozzles are set to be in contact with a molding surface while molding,
liquid transporters configured to transport the materials from the reservoirs to the dispensing nozzles,
temperature controllers,
a molding stage,
a relative movement mechanism, including a motor, configured to three-dimensionally relatively move the stage and the two or more dispensing nozzles, and
a computer configured to control the liquid transporters, the temperature controllers, and the relative movement mechanism,
wherein the dispensing nozzles are configured to smooth the molding surface when the ends of the dispensing nozzles are in contact with the molding surface.

20. A three-dimensional molding apparatus using two or more molding materials, the materials being at least a material A and a material B, the apparatus comprising:
reservoirs configured to store the molding materials,
dispensing nozzles configured to dispense all the molding materials, wherein ends of each of the dispensing nozzles are set to be in contact with a molding surface while molding,
liquid transporters configured to transport the materials from the reservoirs to the dispensing nozzles,
temperature controllers,
a molding stage,
a relative movement mechanism, including a motor, configured to three-dimensionally relatively move the stage and the two or more dispensing nozzles, and
a computer configured to control the liquid transporters, the temperature controllers, and the relative movement mechanism,
wherein the dispensing nozzles are configured to smooth the molding surface when the ends of the dispensing nozzles are in contact with the molding surface and the dispensing nozzle configured to dispense material A is configured to prevent curing of dispensed material at the nozzle, whereby clogging of the dispensing nozzle configured to dispense material A is prevented when material A contains 10% or more by mass of a photocurable component.

\* \* \* \* \*